US012603231B2

(12) United States Patent
Oie

(10) Patent No.: US 12,603,231 B2
(45) Date of Patent: Apr. 14, 2026

(54) ELECTRONIC COMPONENT AND METHOD FOR MANUFACTURING THE SAME

(71) Applicant: Murata Manufacturing Co., Ltd., Kyoto (JP)

(72) Inventor: Hirofumi Oie, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 141 days.

(21) Appl. No.: 18/508,390

(22) Filed: Nov. 14, 2023

(65) Prior Publication Data

US 2024/0087813 A1     Mar. 14, 2024

Related U.S. Application Data

(63) Continuation of application No. PCT/JP2022/003150, filed on Jan. 27, 2022.

(30) Foreign Application Priority Data

May 18, 2021    (JP) ................................. 2021-083996

(51) Int. Cl.
  *H01G 4/33*        (2006.01)
  *H01G 4/232*       (2006.01)
  *H01G 13/04*       (2006.01)
(52) U.S. Cl.
  CPC .............. *H01G 4/33* (2013.01); *H01G 4/232* (2013.01); *H01G 13/04* (2013.01)
(58) Field of Classification Search
  CPC .......... H01G 4/012; H01G 4/232; H01G 4/33; H01G 11/34; H01G 11/46; H01G 11/38
  See application file for complete search history.

(56) References Cited

U.S. PATENT DOCUMENTS

| | | | |
|---|---|---|---|
| 2002/0085334 A1* | 7/2002 | Figueroa .................. | H01G 4/30 361/301.4 |
| 2007/0030628 A1* | 2/2007 | Yamamoto ............. | H01G 4/232 361/311 |
| 2010/0020465 A1* | 1/2010 | Fukudome ............. | H01G 4/232 29/25.42 |

(Continued)

FOREIGN PATENT DOCUMENTS

| | | | |
|---|---|---|---|
| JP | 2004281957 A | * 10/2004 | |
| JP | 2020-136384 A | 8/2020 | |

(Continued)

OTHER PUBLICATIONS

International Search Report for PCT/JP2022/003150 dated Apr. 26, 2022.

*Primary Examiner* — David M Sinclair
(74) *Attorney, Agent, or Firm* — McDonald Hopkins LLC

(57) ABSTRACT

To provide electronic component in which bonding strength between external electrode and plating layer and bonding strength between external electrode and internal conductor can be increased. Electronic component according to present disclosure includes element body, interlayer connection conductor provided inside element body so as to extend to main surface of element body, external electrode formed on main surface of element body so as to cover interlayer connection conductor, and plating layer covering external electrode. Plating layer includes impregnation part that is impregnated into interlayer connection conductor.

13 Claims, 17 Drawing Sheets

(56) References Cited

U.S. PATENT DOCUMENTS

| | | |
|---|---|---|
| 2019/0043662 A1 | 2/2019 | Yamamoto |
| 2020/0312564 A1 | 10/2020 | Onishi et al. |
| 2022/0139599 A1 | 5/2022 | Yonezawa et al. |
| 2022/0199331 A1* | 6/2022 | Jeon ...................... H01G 4/012 |

FOREIGN PATENT DOCUMENTS

| | | |
|---|---|---|
| JP | 2020-167376 A | 10/2020 |
| WO | 2017/179325 A1 | 10/2017 |

* cited by examiner

ELECTRONIC COMPONENT AND METHOD FOR MANUFACTURING THE SAME

CROSS REFERENCE TO RELATED APPLICATION

This is a continuation of International Application No. PCT/JP2022/003150 filed on Jan. 27, 2022 which claims priority from Japanese Patent Application No. 2021-083996 filed on May 18, 2021. The contents of these applications are incorporated herein by reference in their entireties.

BACKGROUND OF THE DISCLOSURE

Field of the Disclosure

The present disclosure relates to an electronic component including an internal conductor provided inside an element body, and an external electrode formed on an outer surface of the element body and connected to the internal conductor, and a method for manufacturing the electronic component.

Description of the Related Art

There is disclosed in Patent Document 1 a high frequency component as an example of an electronic component including an internal conductor provided inside an element body, and an external electrode formed on an outer surface of the element body and connected to the internal conductor. The high frequency component disclosed in Patent Document 1 includes a ceramic substrate in which a plurality of ceramic layers are laminated, a wiring electrode formed inside the ceramic substrate, and an external electrode formed on a lower surface of the ceramic substrate. The wiring electrode and the external electrode are connected via a via conductor (corresponding to the internal conductor) formed in the ceramic layer.

It is known that plating treatment is applied to an external electrode. A plating layer is formed on a surface of the external electrode by plating the external electrode.

In many of electronic components, an internal conductor is made of metal, and an element body is made of resin or the like. Therefore, in a firing process for the element body in which the internal conductor is formed, a crack might occur in the element body due to a difference in shrinkage rate between the internal conductor and the element body. In order to prevent occurrence of cracks, the internal conductor contains resin in addition to metal. Consequently, since the shrinkage rate of the internal conductor approaches that of the element body, the occurrence of cracks is suppressed.
Patent Document 1: WO 2017/179325 A

BRIEF SUMMARY OF THE DISCLOSURE

When a surface of an external electrode is smooth, there occurs a problem that it is difficult to increase a bonding strength between the surface of the external electrode and a plating layer. When an element body on which the external electrode is formed is fired at a high temperature, the external electrode flows in a firing process, so that the surface of the external electrode becomes smooth. Therefore, the above-described problem becomes conspicuous.

When a resin is contained in an internal conductor, the resin contained in the internal conductor burns out in the firing process of an element body in which the internal conductor is formed. At this time, a part from which the resin has been burnt out becomes a cavity. When this cavity is generated in the vicinity of an interface between the internal conductor and the external electrode, a bonding strength between the internal conductor and the external electrode is weakened. This may cause a conduction failure between the internal conductor and the external electrode.

Therefore, a possible benefit of the present disclosure is to solve the above problems, and to provide an electronic component in which a bonding strength between an external electrode and a plating layer and a bonding strength between the external electrode and an internal conductor can be increased.

In order to achieve the above possible benefit, the present disclosure is configured as follows. An electronic component according to one aspect of the present disclosure includes: an element body; an internal conductor provided inside the element body so as to extend to an outer surface of the element body; an external electrode formed on the outer surface of the element body so as to cover at least a part of the internal conductor; and a plating layer covering at least a part of the external electrode, wherein the plating layer includes an impregnation part that is impregnated into the internal conductor.

According to the present disclosure, a bonding strength between an external electrode and a plating layer and a bonding strength between the external electrode and an internal conductor can be increased.

DETAILED DESCRIPTION OF THE DISCLOSURE

Figure 1:
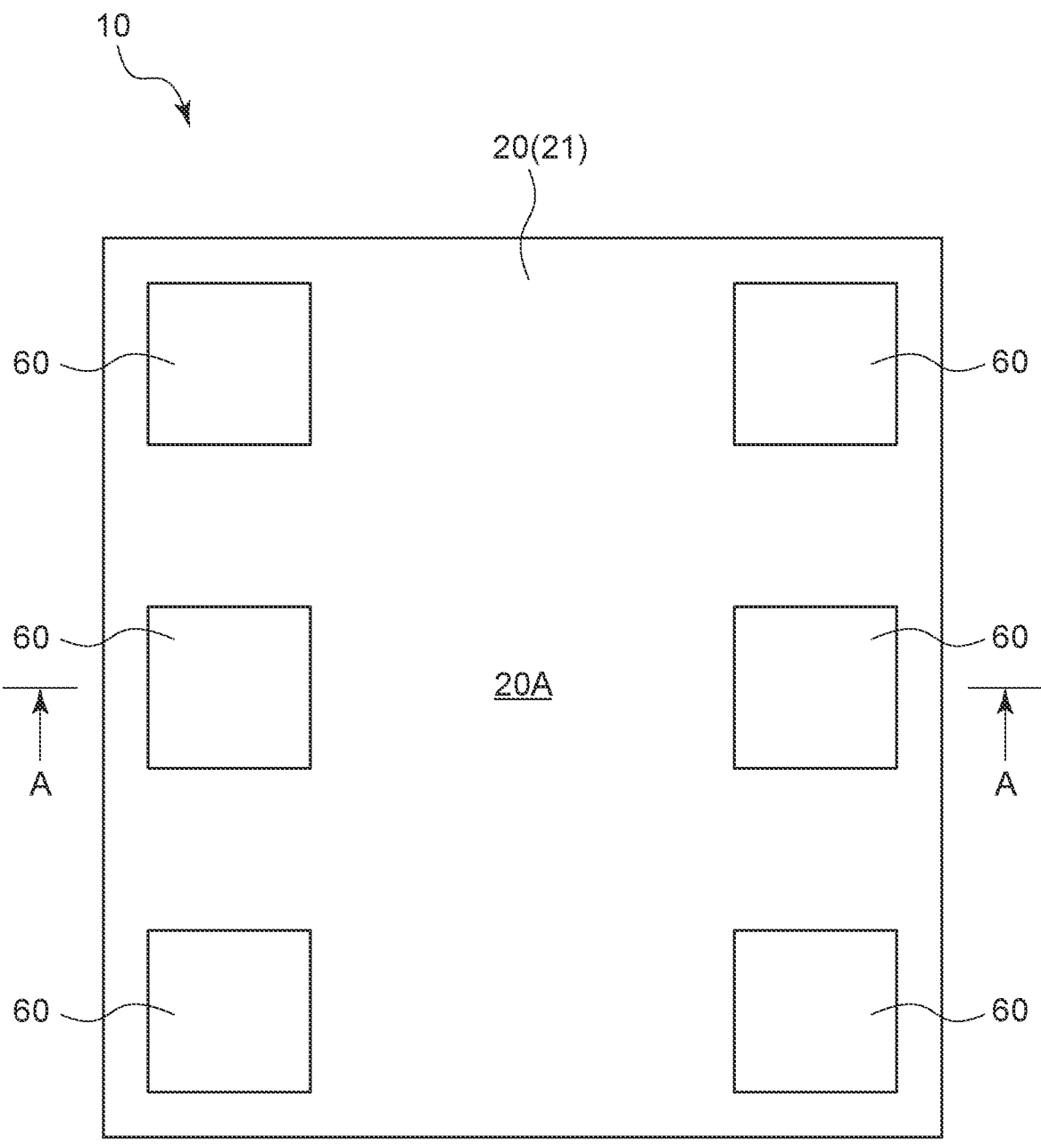
FIG. 1 is a bottom view of an electronic component according to a first embodiment of the present disclosure.

An electronic component according to one aspect of the present disclosure includes: an element body; an internal conductor provided inside the element body so as to extend to an outer surface of the element body; an external electrode formed on the outer surface of the element body so as to cover at least a part of the internal conductor; and a plating layer covering at least a part of the external electrode, wherein the plating layer includes an impregnation part that is impregnated into the internal conductor.

According to this configuration, the internal conductor is impregnated with the plating layer. This increases a bonding strength between the plating layer and the internal conductor. Here, the external electrode covers the internal conductor, and the plating layer covers the external electrode. In other words, the external electrode is positioned so as to have at least a part thereof sandwiched between the internal conductor and the plating layer. An increase in the bonding strength between the plating layer and the internal conductor which are located so as to sandwich at least a part of the external electrode enables an increase in a bonding strength between the external electrode and the plating layer and a bonding strength between the external electrode and the internal conductor.

In the electronic component, the element body may have a configuration in which a plurality of insulating and plate-shaped base materials are laminated, the external electrode may be formed on a main surface facing an outside of the element body among main surfaces of the plurality of base materials, and the internal conductor may be filled in a through hole penetrating at least one of the plurality of base materials.

Ordinarily, the internal conductor formed by being filled in the through hole has a cross-sectional area smaller than an area of the external electrode. Therefore, a connection strength of the internal conductor to the external electrode is low. However, according to this configuration, since the internal conductor is impregnated with the plating layer, the bonding strength between the plating layer and the internal conductor which are located so as to sandwich the external electrode is increased. Consequently, the bonding strength between the external electrode and the internal conductor can be increased.

In the electronic component, the internal conductor may include a first through electrode penetrating a first base material on which the external electrode is formed among the plurality of base materials, and a second through electrode penetrating a second base material laminated on the first base material among the plurality of base materials and being in contact with the first through electrode, and the impregnation part may be impregnated into the first through electrode and the second through electrode.

According to this configuration, the impregnation part is impregnated into a deeper position than in the configuration in which only the first through electrode is impregnated with the impregnation part. Therefore, the bonding strength between the internal conductor and the plating layer can be further increased.

In the electronic component, the element body may have a configuration in which a plurality of insulating and plate-shaped base materials are laminated, the outer surface of the element body on which the external electrode is formed may be configured with side surfaces of the plurality of base materials, and the internal conductor may be formed in a main surface located inside the element body among the main surfaces of the plurality of base materials.

Ordinarily, the internal conductor formed by printing on the main surface of the base material is thin in thickness. Therefore, a connection strength of the internal conductor to the external electrode is low. However, according to this configuration, since the internal conductor is impregnated with the plating layer, the bonding strength between the plating layer and the internal conductor which are located so as to sandwich the external electrode is increased, so that the bonding strength between the external electrode and the internal conductor can be increased.

In the electronic component, the external electrode may be impregnated with the impregnation part.

According to the this configuration, since the external electrode is impregnated with the impregnation part, the bonding strength between the external electrode and the plating layer can be increased.

In the electronic component, a boundary part of the internal conductor with the plating layer may be impregnated with the impregnation part at a higher density than a boundary part of the external electrode with the plating layer.

Ordinarily, the external electrode is thin in thickness. Therefore, too high a density of the impregnation part impregnated into the external electrode increases a possibility of occurrence of a phenomenon in which at the time of soldering the electronic component to another member such as a substrate, the external electrode is dissolved in solder and the external electrode is resultantly eliminated. According to this configuration, the boundary part of the internal conductor with the plating layer is impregnated with the impregnation part at a higher density than the boundary part of the external electrode with the plating layer. Therefore, the possibility of occurrence of such phenomenon in which the external electrode is eliminated as described above can be reduced.

In the electronic component, the external electrode and the internal conductor may include a first part overlapping the internal conductor when viewed from a direction orthogonal to the outer surface of the element body and a second part not overlapping the internal conductor when viewed from the direction orthogonal to the outer surface of the element body, and a boundary part of the first part with the plating layer may be impregnated with the impregnation part at a higher density than a boundary part of the second part with the plating layer.

Ordinarily, the second part is thinner in thickness than the first part. Therefore, impregnation of the impregnation part into the second part at a higher density than into the first part increases a possibility of occurrence of a phenomenon in which at the time of soldering the electronic component to another member such as a substrate, the second part is dissolved in solder and the second part is resultantly eliminated. According to this configuration, the impregnation part is impregnated into the first part at a higher density than into the second part. Therefore, the possibility of occurrence of such phenomenon in which the second part is eliminated as described above can be reduced.

In the electronic component, the external electrode may be interposed between the internal conductor and the plating layer, the internal conductor may be separated from the plating layer, and the internal conductor may be impregnated with the impregnation part via the external electrode.

According to this configuration, since the external electrode is impregnated with the impregnation part, the bonding strength between the external electrode and the plating layer can be increased. In addition, since the impregnation part impregnated into the external electrode is impregnated into the internal conductor, the bonding strength between the external electrode and the internal conductor can be increased.

In the electronic component, the external electrode may be formed on the outer surface of the element body so as to cover a part of the internal conductor, and the internal conductor may be in contact with the plating layer on the outer surface of the element body.

According to this configuration, since the internal conductor is in contact with the plating layer, the bonding strength between the internal conductor and the plating layer can be more enhanced than in the configuration in which the external electrode is interposed between the internal conductor and the plating layer.

A method for manufacturing an electronic component according to one aspect of the present disclosure includes: an internal conductor forming step of forming an internal conductor by filling a through hole penetrating at least one of a plurality of insulating and plate-shaped base materials in a thickness direction with a conductive first paste in which a resin component is mixed; an external electrode forming step of forming an external electrode by printing a conductive second paste on a main surface of the base material in which the internal conductor is formed so as to completely cover the internal conductor; an element body forming step of forming an element body by laminating the plurality of base materials such that the main surface of the base material on which the external electrode is formed becomes an outer surface; a firing step of firing the element body so as to form a cavity that penetrates the external electrode to reach the internal conductor; and a plating layer laminating step of laminating a conductive plating layer on an outer surface of the fired element body so as to cover at least a part of the external electrode where the cavity is formed.

According to this manufacturing method, in the firing step, the cavity that penetrates the external electrode to reach the internal conductor is formed. Thereafter, when the plating layer laminating step is performed, the cavity formed in the external electrode can be impregnated with the plating layer.

According to this manufacturing method, a resin component is mixed with the first paste. Therefore, in the firing step, the resin component is burned out to form a cavity in the internal conductor. Thereafter, when the plating layer laminating step is performed, the cavity formed in the internal conductor can be impregnated with the plating layer via the cavity formed in the external electrode.

A method for manufacturing an electronic component according to one aspect of the present disclosure includes: an internal conductor forming step of forming an internal conductor by filling a through hole penetrating at least one of a plurality of insulating and plate-shaped base materials in a thickness direction with a conductive first paste in which a resin component is mixed; an external electrode forming step of forming an external electrode by printing a conductive second paste on a main surface of the base material in which the internal conductor is formed so as to cover a part of the internal conductor; an element body forming step of forming an element body by laminating the plurality of base materials such that the main surface of the base material on which the external electrode is formed becomes an outer surface; a firing step of firing the element body; and a plating layer laminating step of laminating a conductive plating layer on an outer surface of the fired element body so as to cover at least a part of the external electrode and at least a part of a part of the internal conductor not covered with the external electrode.

According to this manufacturing method, a resin component is mixed with the first paste. Therefore, in the firing step, the resin component is burned out to form a cavity in the internal conductor. In addition, in the external electrode forming step, the external electrode covers only a part of the interlayer connection conductor. Thereafter, when the plating layer laminating step is performed, the plating layer covers a part of the internal conductor not covered with the external electrode. Consequently, the cavities formed in the internal conductor can be impregnated with the plating layer without through the external electrode.

A method for manufacturing an electronic component according to one aspect of the present disclosure includes: an internal conductor forming step of forming an internal conductor by printing a conductive first paste in which a resin component is mixed in a region including an outer edge of a main surface of at least one of a plurality of insulating and plate-shaped base materials; an element body forming step of forming an element body by laminating the plurality of base materials such that the main surface of the base material in which the internal conductor is formed becomes an inner surface; an external electrode forming step of forming an external electrode by applying a conductive second paste to a side surface of the element body configured with side surfaces of the plurality of base materials so as to cover the internal conductor located at the outer edge of the main surface of the base material; a firing step of firing the element body in which the external electrode is formed so as to form a cavity that penetrates the external electrode to reach the internal conductor; and a plating layer laminating step of laminating a conductive plating layer on the side surface of the fired element body so as to cover at least a part of the external electrode where the cavity is formed.

According to this manufacturing method, in the firing step, the cavity that penetrates the external electrode to reach the internal conductor is formed. Thereafter, when the plating layer laminating step is performed, the cavity formed in the external electrode can be impregnated with the plating layer.

According to this manufacturing method, a resin component is mixed with the first paste. Therefore, in the firing step, the resin component is burned out to form a cavity in the internal conductor. Thereafter, when the plating layer laminating step is performed, the cavity formed in the internal conductor can be impregnated with the plating layer via the cavity formed in the external electrode.

In the above-described manufacturing method, a resin component may be mixed with the second paste.

According to this manufacturing method, a resin component is mixed with the second paste. Therefore, in the firing step, the resin component is burned out to form a cavity in the external electrode configured with the second paste. Therefore, when the plating layer laminating step is performed thereafter, the cavity formed in the external electrode can be impregnated with the plating layer.

In the above-described manufacturing method, a ratio of the resin component contained in the second paste may be lower than a ratio of the resin component contained in the first paste.

Ordinarily, the external electrode configured with the second paste is thin in thickness. Therefore, too high the ratio of the resin component contained in the second paste increases a possibility of occurrence of the phenomenon in which at the time of soldering the electronic component manufactured by this manufacturing method to another member such as a substrate, the external electrode is dissolved in solder and the external electrode is resultantly eliminated. According to this manufacturing method, the ratio of the resin component contained in the second paste is lower than the ratio of the resin component contained in the first paste. Therefore, the possibility of occurrence of such phenomenon in which the external electrode is eliminated as described above can be reduced.

First Embodiment

Figure 2:
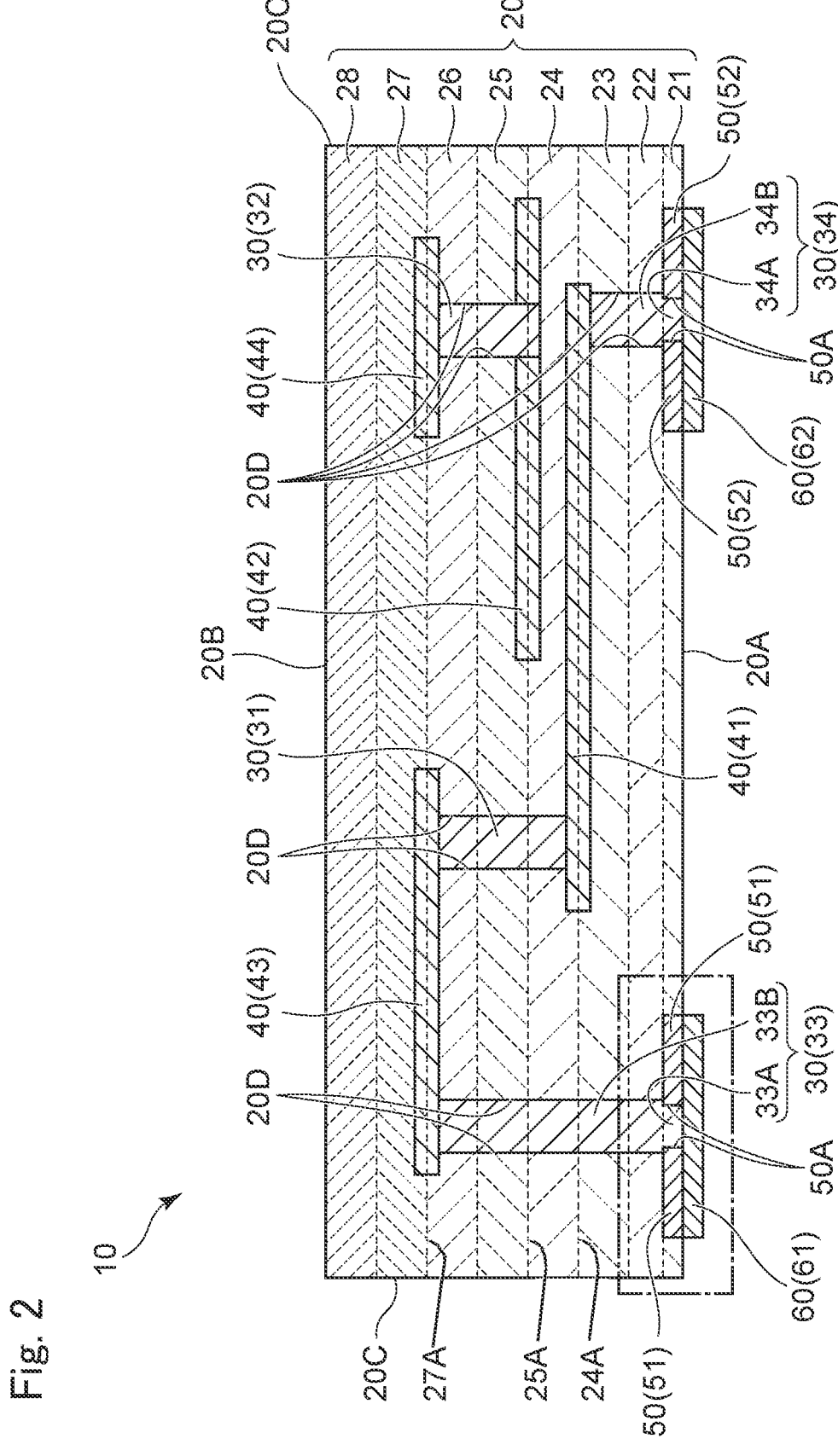
FIG. 2 is a cross-sectional view showing a cross section taken along line A-A in FIG. 1.

FIG. 1 is a bottom view of an electronic component according to a first embodiment of the present disclosure. FIG. 2 is a cross-sectional view showing a cross section taken along line A-A in FIG. 1. The electronic component includes an element body provided with an internal conductor and an external electrode. The electronic component can be mounted on a mother substrate or the like via the external electrode.

As shown in FIGS. 1 and 2, an electronic component 10 according to the first embodiment includes an element body 20, an interlayer connection conductor 30, an internal electrode 40, an external electrode 50, and a plating layer 60.

The element body 20 has a rectangular parallelepiped shape as a whole. The shape of the element body 20 is not limited to a rectangular parallelepiped shape. In the first embodiment, the element body 20 is formed by integrating eight laminated base materials 21 to 28. The number of base materials constituting the element body 20 is not limited to eight. Each of the base materials 21 to 28 is insulative and has a plate shape. In the first embodiment, the element body 20 (each of the base materials 21 to 28) is made of low temperature co-fired ceramics (LTCC). The element body 20 is not limited to LTCC, and may be made of ceramic other than LTCC, such as alumina, or may be made of resin such as glass epoxy, Teflon (registered trademark), or paper phenol.

As illustrated in FIG. 2, the element body 20 includes main surfaces 20A and 20B and a side surface 20C. The main surface 20A is a main surface of the base material 21 and faces the outside of the element body 20. The main surface 20B is a main surface of the base material 28 and faces the outside of the element body 20. The main surface 20B faces opposite to the main surface 20A. The side surface 20C is configured with side surfaces of the base materials 21 to 28. The side surface 20C links the main surfaces 20A and 20B.

The interlayer connection conductor 30 is formed inside the element body 20. The interlayer connection conductor 30 can be formed in at least one of the base materials 21 to 28. In the first embodiment, the interlayer connection conductor 30 is formed in the base materials 21 to 26.

The interlayer connection conductor 30 is formed by filling a through hole 20D penetrating at least one of the plurality of base materials 21 to 28 in a thickness direction of the base materials 21 to 28 with a conductive paste and co-firing the paste with a ceramic (LTCC in the first embodiment). The conductive paste contains, for example, a conductive powder such as copper. The conductive powder contained in the conductive paste is not limited to copper, and may be, for example, silver. In a case where the element body 20 is made of resin, the interlayer connection conductor 30 is formed by plating conductive metal made of copper or the like. In the first embodiment, since the through hole 20D has a cylindrical shape, the interlayer connection conductor 30 has a cylindrical shape. The shape of the through hole 20D is not limited to the cylindrical shape, and may be, for example, a shape such as a quadrangular prism.

In FIG. 2, the interlayer connection conductor 30 includes four interlayer connection conductors 31 to 34. The interlayer connection conductor 31 is filled in the through hole 20D penetrating the base materials 24 to 26. The interlayer connection conductor 32 is filled in the through hole 20D penetrating the base material 25, 26. The interlayer connection conductor 33 is filled in the through hole 20D penetrating the base materials 21 to 26. The interlayer connection conductor 34 is filled in the through hole 20D penetrating the base materials 21 to 23. The number of the interlayer connection conductors 30 is not limited to four. A length of each of the interlayer connection conductors 31 to 34 in a thickness direction (the number of base materials through which the interlayer connection conductor penetrates) is not limited to the length described above.

The interlayer connection conductors 31 and 32 are not exposed to the outside of the element body 20. On the other hand, the interlayer connection conductors 33 and 34 extend from the inside of the element body 20 to the main surface 20A of the element body 20, and are exposed to the outside of the element body 20 at the main surface 20A. The main surface 20A is an example of an outer surface of the element body. The interlayer connection conductors 33, 34 are an example of the internal conductor.

The internal electrode 40 is formed inside the element body 20 and is not exposed to the outside of the element body 20. The internal electrode 40 can be formed in at least one of the base materials 21 to 28. In the first embodiment, the internal electrode 40 is formed on a main surface 24A of the base material 24, a main surface 25A of the base material 25, and a main surface 27A of the base material 27.

In a case where the element body 20 is made of ceramic as in the first embodiment, the internal electrode 40 is formed by printing a conductive paste on the main surface (in the first embodiment, the main surfaces 24A, 25A, and 27A) of the base material and co-firing the paste with the base material. The conductive paste is made of, for example, copper or silver. In a case where the element body 20 is made of resin, the internal electrode 40 is formed on the main surface of the base material by a known means such as metal foil etching.

In FIG. 2, the internal electrode 40 includes four internal electrodes 41 to 44. The internal electrode 41 is formed on the main surface 24A of the base material 24. The internal electrode 42 is formed on the main surface 25A of the base material 25. The internal electrodes 43 and 44 are formed on the main surface 27A of the base material 27.

Each of the internal electrodes 40 is electrically connected to other internal electrode 40 and external electrode 50 via the interlayer connection conductor 30. In the first embodiment, the internal electrodes 41 and 43 are electrically connected to each other via the interlayer connection conductor 31. In addition, the internal electrodes 42 and 44 are electrically connected to each other via the interlayer connection conductor 32. The internal electrode 43 and an external electrode 51 to be described later are electrically connected to each other via the interlayer connection conductor 33. The internal electrode 41 and an external electrode 52 to be described later are electrically connected to each other via the interlayer connection conductor 34.

The external electrode 50 is formed on an outer part of the element body 20. In other words, the external electrode 50 is exposed to the outside of the element body 20. In the first embodiment, the external electrode 50 is formed on the main surface of the base material 21, i.e., the main surface 20A of the element body 20. The external electrode 50 may be formed on a main surface of the base material 28, i.e., the main surface 20B of the element body 20. In other words, the external electrode 50 is formed on a main surface facing the outside of the element body 20 among the main surfaces of the plurality of base materials 21 to 28.

The external electrode 50 is configured in the same manner as the internal electrode 40. Specifically, in the first embodiment, the external electrode 50 is obtained by printing a conductive paste on the main surface 20A of the element body 20 and co-firing the paste with the base materials 21 to 28.

In FIG. 2, the external electrode 50 includes two external electrodes 51 and 52. As described above, in the first embodiment, the external electrode 51 is electrically connected to the internal electrode 43 via the interlayer connection conductor 33. The external electrode 52 is electrically connected to the internal electrode 41 via the interlayer connection conductor 34.

In the first embodiment, each of the external electrodes 51 and 52 has a through hole 50A penetrating in a thickness direction. When viewed from the thickness direction, the through hole 50A overlaps with the through hole 20D constituting the interlayer connection conductors 33, 34. When viewed from the thickness direction, the through hole 50A has a diameter smaller than a diameter of the through hole 20D. Consequently, an outer edge of the interlayer connection conductor 33 viewed from the thickness direction is covered with the external electrode 51. Similarly, an outer edge of the interlayer connection conductor 34 viewed from the thickness direction is covered with the external electrode 52.

On the other hand, a part of the interlayer connection conductor 33 excluding the outer edge when viewed from the thickness direction is not covered with the external electrode 51. Similarly, a part of the interlayer connection conductor 34 excluding the outer edge when viewed from the thickness direction is not covered with the external electrode 52.

From the foregoing, the external electrode 50 is formed on the main surface 20A of the element body 20 so as to cover a part of the interlayer connection conductors 33, 34.

The interlayer connection conductor 33 enters the through hole 50A of the external electrode 51, and the interlayer connection conductor 34 enters the through hole 50A of the external electrode 52. Consequently, the interlayer connection conductors 33 and 34 are exposed to the outside of the element body 20.

The plating layer 60 covers the external electrode 50 and a part of the interlayer connection conductors 33, 34 that enters the through hole 50A and is exposed to the outside of the element body 20.

The plating layer 60 suppresses influences of atmosphere, moisture, and the like on the external electrodes 51 and 52 and the interlayer connection conductors 33 and 34. The plating layer 60 is a film made of, for example, Ni—Sn, Ni-electroless Au, or the like.

In the first embodiment, as shown in FIG. 1, the electronic component 10 includes six plating layers 60. The number of the plating layers 60 included in the electronic component 10 is not limited to six. In FIG. 2, out of the six plating layers 60, two plating layers 61 and 62 are illustrated. The plating layer 61 covers the external electrode 51 and a part of the interlayer connection conductor 33 that enters the through hole 50A and is exposed to the outside of the element body 20. The plating layer 62 covers the external electrode 52 and a part of the interlayer connection conductor 34 that enters the through hole 50A and is exposed to the outside of the element body 20.

In other words, in the first embodiment, the plating layer 61 covers the external electrode 51 on the main surface 20A of the element body 20 to be in contact with the external electrode 51, and covers the interlayer connection conductor 33 on the main surface 20A of the element body 20 to be in contact with the interlayer connection conductor 33. In addition, the plating layer 62 covers the external electrode 52 on the main surface 20A of the element body 20 to be in contact with the external electrode 52, and covers the interlayer connection conductor 34 on the main surface 20A of the element body 20 to be in contact with the interlayer connection conductor 34.

Figure 3:
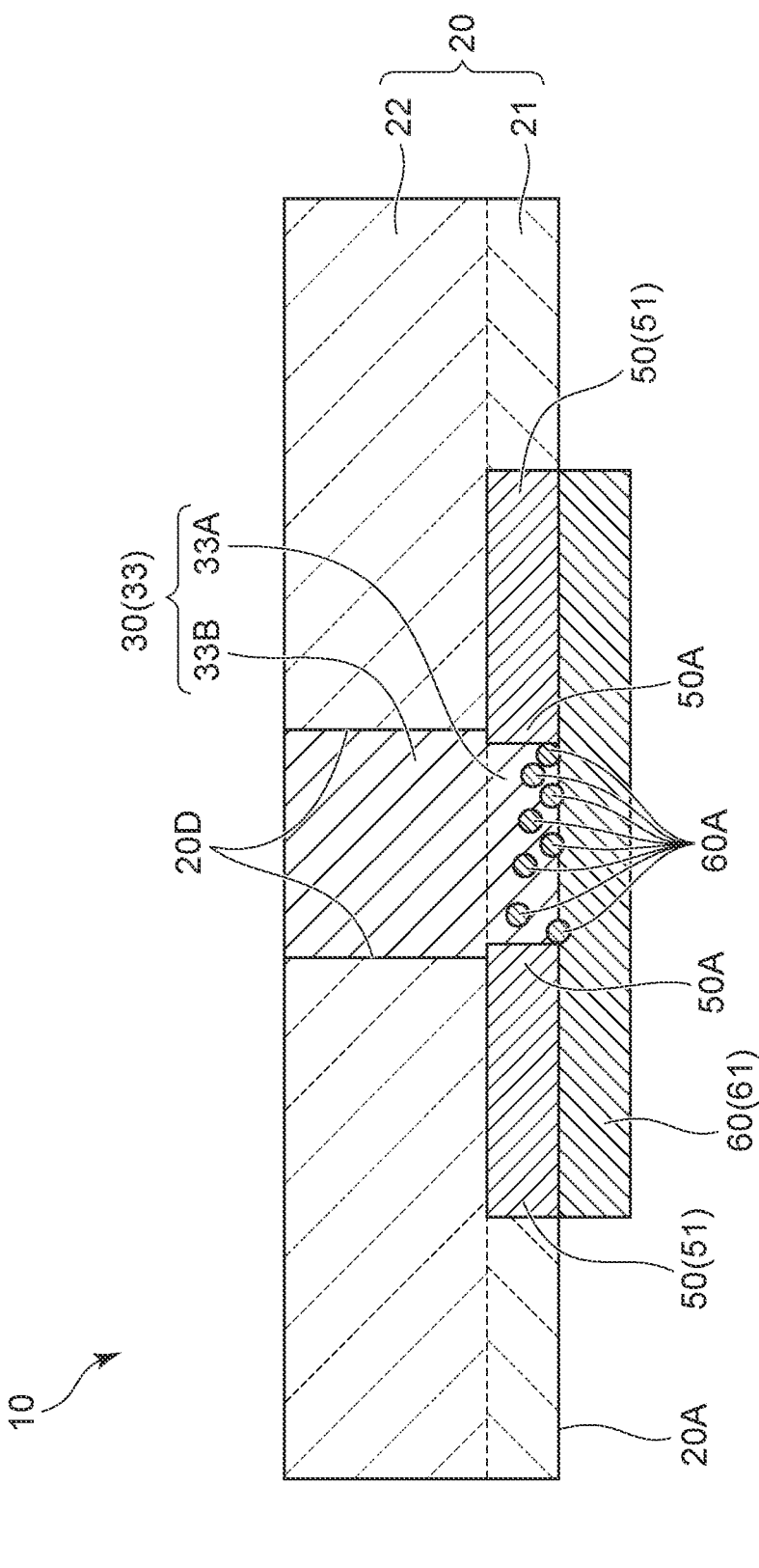
FIG. 3 is an enlarged view of a part indicated by a dashed line in FIG. 2.

FIG. 3 is an enlarged view of a part indicated by the dashed line in FIG. 2. As shown in FIG. 3, the plating layer 60 has an impregnation part 60A.

A part of the plating layer 60 is impregnated into other part in contact with the plating layer 60. This part is the impregnation part 60A. Impregnation means that a constituent of the plating layer 60 penetrates into a minute cavity included in the other part, so that the cavity is filled with the constituent. In other words, the constituent filling the cavity corresponds to the impregnation part 60A.

In the first embodiment, the interlayer connection conductor 30 is impregnated with the plating layer 60. In more detail, as illustrated in FIG. 3, the interlayer connection conductor 33 is impregnated with the plating layer 61. Although not illustrated, the interlayer connection conductor 34 is impregnated with the plating layer 62.

In FIG. 3, while a part 33A of the interlayer connection conductor 33 formed in the base material 21 is impregnated with the plating layer 61, a part 33B of the interlayer connection conductor 33 formed in the base material 22 to 26 is not impregnated with the plating layer 61. In other words, the plating layer 61 has an impregnation part 61A that is impregnated into the part 33A of the interlayer connection conductor 33 formed in the base material 21.

Similarly, a part 34A (see FIG. 2) of the interlayer connection conductor 34 formed in the base material 21 is impregnated with the plating layer 62, while a part 34B (see FIG. 2) of the interlayer connection conductor 34 formed in the base material 22, 23 is not impregnated with the plating layer 62. In other words, the plating layer 62 has an impregnation part that is impregnated into the part 34A of the interlayer connection conductor 34 formed in the base material 21.

In FIG. 3, and FIGS. 8 to 11 and 14 to be described later, the above-described cavities are represented by a spherical shape having an uniform size for convenience of description. In practice, however, the above-mentioned cavities are of various shapes and of various sizes. For example, the above-mentioned cavities are elongated and have a curved shape. In FIG. 3, and FIGS. 8 to 11 and 14 to be described later, a part of the impregnation part 60A is separated from the plating layer 60. In practice, however, such impregnation part 60A is linked to the plating layer 60 in other parts in a depth direction of the page of FIG. 3, and FIGS. 8 to 11 and 14 to be described later.

According to the first embodiment, the interlayer connection conductor 30 is impregnated with the plating layer 60. In detail, the interlayer connection conductor 33 is impregnated with the plating layer 61, and the interlayer connection conductor 34 is impregnated with the plating layer 62. This increases a bonding strength between the plating layer 60 and the interlayer connection conductors 33, 34. Here, the external electrodes 51, 52 cover the interlayer connection conductors 33, 34, and the plating layer 60 covers the external electrodes 51, 52. In other words, the external electrodes 51, 52 are positioned such that at least a part thereof is sandwiched between the interlayer connection conductors 33, 34 and the plating layer 60. An increase in the bonding strength between the plating layer 60 and the interlayer connection conductors 33, 34 which are located so as to sandwich at least a part of the external electrodes 51, 52 enables an increase in a bonding strength between the external electrodes 51, 52 and the plating layer 60 and a bonding strength between the external electrodes 51, 52 and the interlayer connection conductors 33, 34.

Ordinarily, the interlayer connection conductors 33, 34 formed by being filled in the through hole 20D has a cross-sectional area smaller than an area of the external electrodes 51, 52. Therefore, a connection strength of the interlayer connection conductors 33, 34 to the external electrodes 51, 52 is low. However, according to the first embodiment, since the interlayer connection conductors 33, 34 is impregnated with the plating layer 60, the bonding strength between the plating layer 60 and the interlayer connection conductors 33, 34 which are located so as to sandwich the external electrodes 51, 52 is increased. Consequently, the bonding strength of the external electrodes 51, 52 and the interlayer connection conductors 33, 34 can be increased.

According to the first embodiment, since the interlayer connection conductors 33, 34 are in contact with the plating layer 60, the bonding strength between the interlayer connection conductors 33, 34 and the plating layer 60 can be more increased as compared with that in the configuration in which the external electrodes 51, 52 are interposed between the interlayer connection conductors 33, 34 and the plating layer 60.

<Method for Manufacturing Electronic Component According to First Embodiment>

Figure 4:
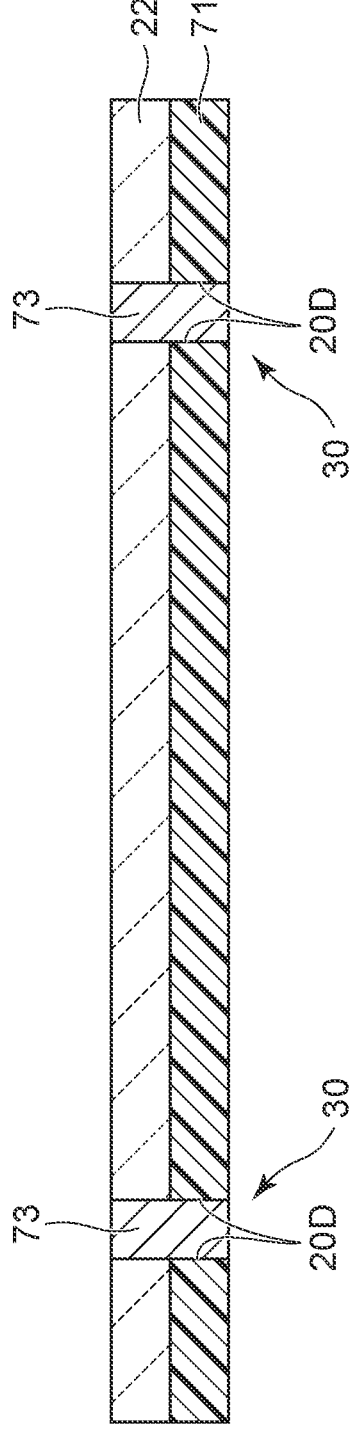
FIG. 4 is a cross-sectional view when an interlayer connection conductor is formed in a base material in a method for manufacturing an electronic component according to the first embodiment of the present disclosure.
Figure 5:
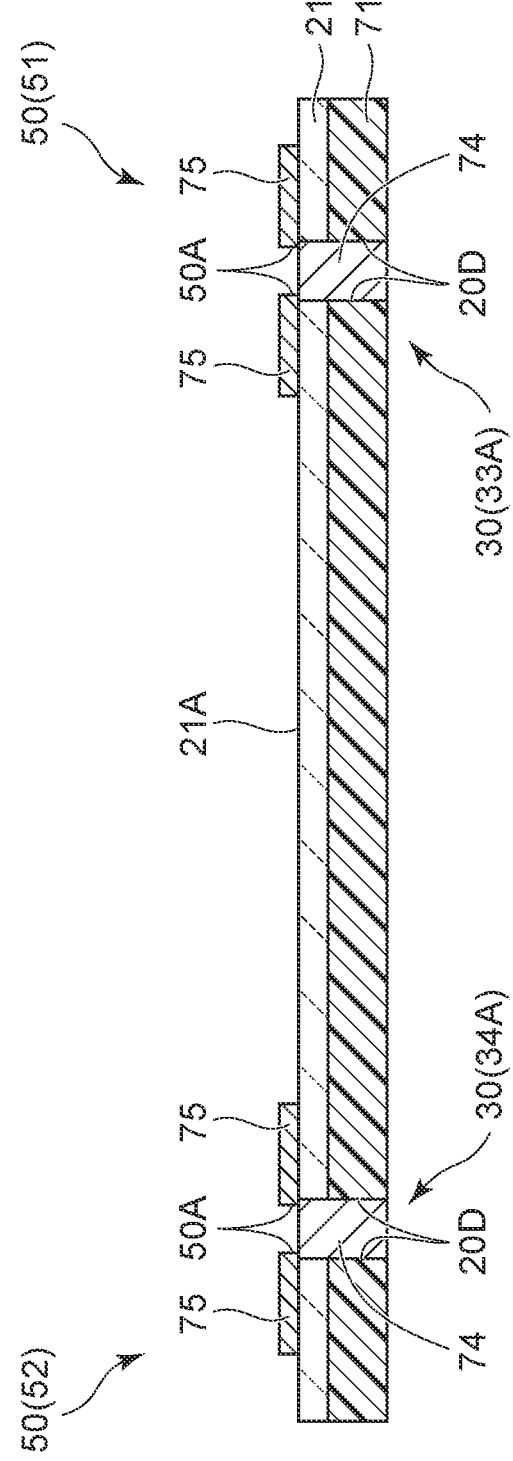
FIG. 5 is a cross-sectional view when an external electrode is printed on the base material of FIG. 4.
Figure 6:
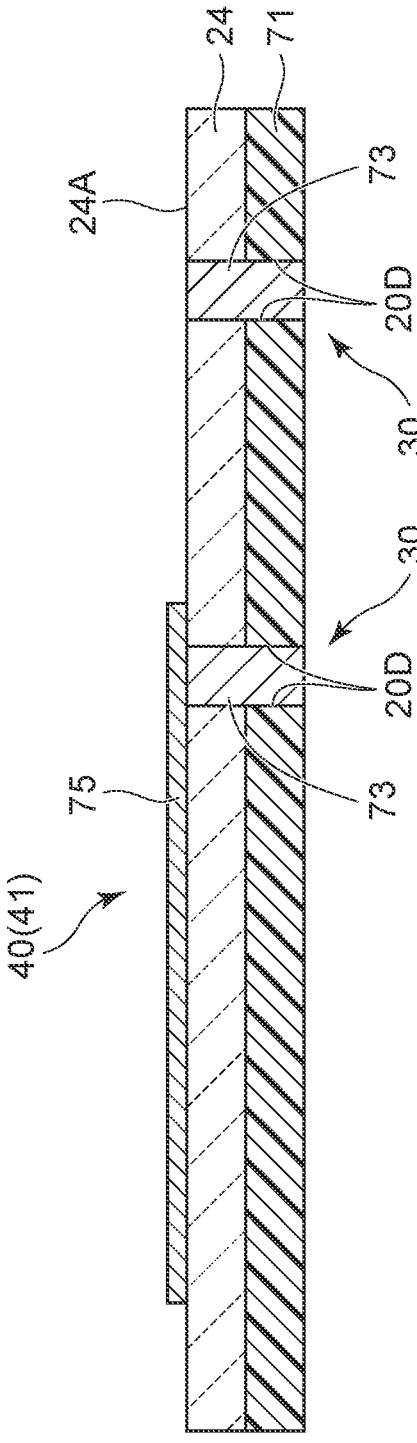
FIG. 6 is a cross-sectional view when an internal electrode is printed on the base material in the method for manufacturing an electronic component according to the first embodiment of the present disclosure.
Figure 7:
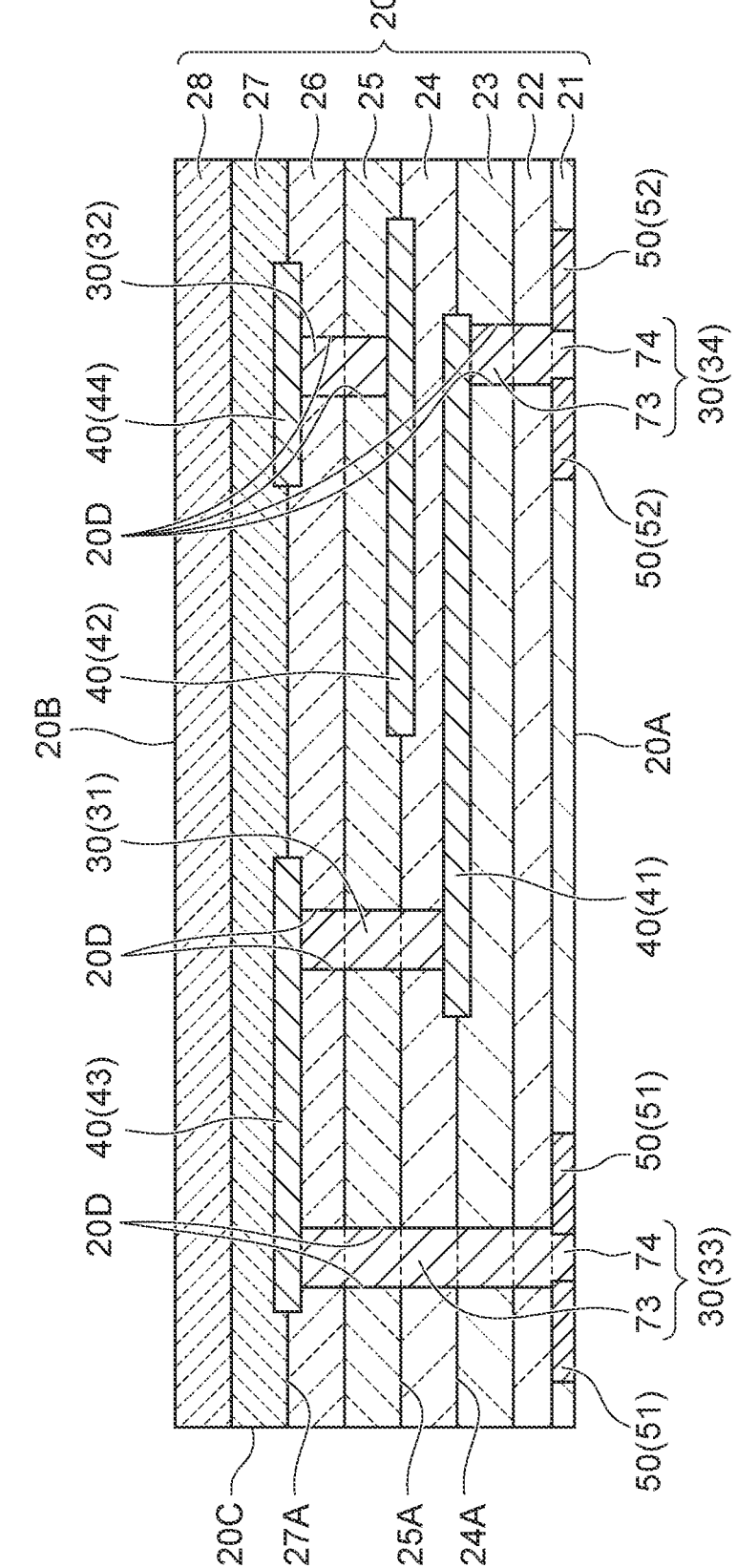
FIG. 7 is a cross-sectional view when a plurality of base materials are laminated to form an element body in the method for manufacturing an electronic component according to the first embodiment of the present disclosure.

In the following, a method for manufacturing the electronic component 10 according to the first embodiment will be described with reference to FIGS. 4 to 7. FIG. 4 is a cross-sectional view when an interlayer connection conductor is formed in a base material in the method for manufacturing an electronic component according to the first embodiment of the present disclosure. FIG. 5 is a cross-sectional view when an external electrode is printed on the base material in FIG. 4. FIG. 6 is a cross-sectional view when an internal electrode is printed on the base material in the method for manufacturing an electronic component according to the first embodiment of the present disclosure. FIG. 7 is a cross-sectional view when a plurality of base materials are laminated to form an element body in the method for manufacturing an electronic component according to the first embodiment of the present disclosure.

The electronic component 10 is manufactured by segmenting a laminate into a plurality of the element bodies 20. The laminate is formed by integrating the plurality of element bodies 20 in an arrayed state. In FIGS. 4 to 7, for convenience of description, only a part corresponding to one element body 20 of the laminate is shown.

(Sheet Molding Step)

First, a sheet molding step is performed. In the sheet molding step, the base materials 21 to 28 illustrated in FIG. 2 are individually formed. In the base materials 21 to 28 molded in the sheet molding step, a raw material containing a main agent, a plasticizer, a binder, and the like corresponding to the respective base materials 21 to 28 is mixed to prepare slurry constituting the base materials 21 to 28. Each of the base materials 21 to 28 at this stage is a green sheet configured with the slurry.

For each of the base materials 21 to 28, for example, a sinterable ceramic powder or the like is used as a main agent. As a plasticizer, for example, phthalic acid ester or di-n-butyl phthalate is used. As a binder, for example, an acrylic resin, polyvinyl butyral, or the like is used.

The slurry constituting each of the base materials 21 to 28 is molded into a sheet shape on a carrier film 71 illustrated in FIG. 4 using, for example, a lip coater, a doctor blade, or the like. In other words, each of the eight base materials 21 to 28 is molded on each of eight carrier films 71. As the carrier film 71, for example, a polyethylene terephthalate (PET) film or the like is used. Each of the base materials 21 to 28 has a thickness of, for example, 5 to 100 μm.

In FIG. 4, the carrier film 71 and the base material 22 molded on the carrier film 71 are shown.

Next, the through hole 20D penetrating each of the base materials 21 to 28 and the carrier film 71 in a thickness direction is formed.

Although in FIG. 4, two through holes 20D are formed in the base material 22 and the carrier film 71, the number of through holes 20D formed in each of the base materials 21 to 27 is not limited to two. In addition, the number of the through holes 20D formed in each of the eight base materials 21 to 28 and the carrier film 71 may be the same or different. In addition, the number of the through holes 20D formed in each of the eight base materials 21 to 28 and the carrier film 71 may be at the same position or at different positions.

In the method for manufacturing the electronic component 10 according to the first embodiment, the number and positions of the through holes 20D formed in the eight base materials 21 to 28 and the carrier film 71 are determined so that the element body 20 as shown in FIG. 2 is finally formed.

(Interlayer Connection Conductor Forming Step)

Next, an interlayer connection conductor forming step is performed. In the first embodiment, the interlayer connection conductor forming step corresponds to an internal conductor forming step. In the interlayer connection conductor forming step, conductive pastes 73 and 74 are filled in the through holes 20D formed in the base material 21 to 28 and the carrier film 71 in the sheet molding step (see FIGS. 4 and 5).

The paste 73 is prepared, for example, by mixing a raw material containing a conductive powder, a plasticizer, and a binder. The paste 74 is prepared, for example, by mixing the above-described raw material and a resin component. In other words, the paste 74 contains a resin component in addition to the above-described raw material. As the resin component, one that burns out at the time of firing to be described later is used. The resin component is, for example, in a form of beads. The paste 74 is an example of a first paste.

In the method for manufacturing the electronic component 10 according to the first embodiment, the paste 73 is filled in the through hole 20D formed in each of the base materials 22 to 28 and the carrier film 71 on which each of the base materials 22 to 28 is molded. Consequently, a part of the interlayer connection conductor 30 excluding the parts 33A, 34A of the interlayer connection conductors 33, 34 is formed. In FIG. 4, the base material 22 and the carrier film 71 on which the base material 22 is molded are filled with the paste 73.

On the other hand, as shown in FIG. 5, the through hole 20D formed in the base material 21 and the carrier film 71 on which the base material 21 is molded is filled with the paste 74. Consequently, the parts 33A, 34A of the interlayer connection conductors 33, 34 are formed.

(External Electrode Forming Step)

Next, an external electrode forming step is performed. In the external electrode forming step, the external electrode 50 is formed.

In the method for manufacturing the electronic component 10 according to the first embodiment, as shown in FIG. 5, the paste 75 is formed on a main surface 21A of the base material 21. The paste 75 is formed by, for example, screen printing, inkjet printing, gravure printing, or the like.

Similarly to the paste 73 described above, the paste 75 is prepared by mainly mixing a raw material containing a conductive powder, a plasticizer, and a binder. In other words, in the method for manufacturing the electronic component 10 according to the first embodiment, the paste 75 does not contain a resin component. The paste 75 corresponding to the external electrode 50 is an example of a second paste. Note that the paste 75 may be made of the same raw material as that of the paste 73 or may be made of a raw material different from that of the paste 73, provided that the paste 75 contains a conductive raw material and does not contain a resin component. In the present specification, "not contain a resin component" includes not only a meaning of not containing a resin component at all but also a meaning of containing a small amount of a resin component.

A part of the paste 75 covers a part of the interlayer connection conductor 30 exposed on the main surface 21A. In the method for manufacturing the electronic component 10 according to the first embodiment, a part of the paste 75 covers an outer edge of the interlayer connection conductor 30, and the remaining part of the paste 75 covers the main surface 21A located around the interlayer connection conductor 30.

In the method for manufacturing the electronic component 10 according to the first embodiment, the paste 75 covering one of the two interlayer connection conductors 30 corresponds to the external electrode 51 of the external electrode 50, and the paste 75 covering the other of the two interlayer connection conductors 30 corresponds to the external electrode 52 of the external electrode 50. The through hole 50A is formed in a part of the external electrodes 51, 52 that does not cover the interlayer connection conductor 30 (a part other than the outer edge of the interlayer connection conductor 30).

(Internal Electrode Forming Step)

Next, an internal electrode forming step is performed. The internal electrode forming step may be performed after the interlayer connection conductor forming step and before the external electrode forming step, or may be performed in parallel with the external electrode forming step.

In the internal electrode forming step, the internal electrode 40 is formed in the same manner as in the formation of the external electrode 50 in the external electrode forming step.

In the method for manufacturing the electronic component 10 according to the first embodiment, the paste 75 is formed on main surfaces of the base materials 24, 25, and 27. FIG. 6 illustrates the base material 24 in which the paste 75 is formed on the main surface 24A.

In the method for manufacturing the electronic component 10 according to the first embodiment, the paste 75 formed on the main surface 24A of the base material 24 corresponds to the internal electrode 41 of the internal electrode 40, the paste 75 formed on the main surface 25A of the base material 25 corresponds to the internal electrode 42 of the internal electrode 40, and the paste 75 formed on the main surface 27A of the base material 27 corresponds to the internal electrode 43 of the internal electrode 40.

(Element Body Forming Step)

Next, an element body forming step is performed. In the element body forming step, as illustrated in FIG. 7, the base materials 21 to 28 excluding the carrier film 71 are laminated and pressure-bonded in a mold. As a result, the element body 20 is obtained.

In the element body forming step, the eight base materials 21 to 28 are laminated in an ascending order of a numerical value thereof, specifically, in the order of the base materials 21, 22, 23, 24, 25, 26, 27, and 28. Consequently, the main surface 21A of the base material 21 (see FIG. 5) and the main surface of the base material 28 become the outer surface of the element body 20. In other words, the main surface 21A of the base material 21 serves as the main surface 20A of the element body 20, and the main surface of the base material 28 serves as the main surface 20B of the element body 20.

In the element body forming step, the external electrode 50 enters the base material 21 as a result of pressure-bonding of each of the base materials 21 to 28.

(Segmenting Step)

Next, a segmenting step is performed. In the segmenting step, the laminate in which the plurality of element bodies 20 are arrayed is cut into the plurality of element bodies 20. For cutting the laminate, for example, a dicing saw, a guillotine cutter, a laser, or the like is used. After the laminate is cut, a corner and an edge of the element body 20 may be polished by, for example, barrel processing or the like. The polishing may be performed after a firing step.

(Firing Step)

Next, the firing step is performed. In the firing step, the element body 20 is fired. As a result, each of the base materials 21 to 28 constituting the element body 20 is cured. In other words, each of the base materials 21 to 28, which is a flexible green sheet, is cured and changed into a substrate.

When the element body 20 is fired, a resin component contained in a part of the interlayer connection conductors 33, 34 filled in the through hole 20D of the base material 21, i.e., a part configured with the paste 74, is burned out. As a result, a cavity is formed in the part where the resin component was present.

A generation state of the cavity can be controlled by adjusting firing time and temperature. For example, by shortening a degreasing time of firing, the number of cavities can be increased and a size of the cavities can be increased. The degreasing refers to, for example, a volatilization temperature region of a degreasing component around 400° C.

For example, by increasing a firing temperature, the number of cavities can be increased and a size of the cavities can be increased.

(Plating Layer Laminating Step)

Next, a plating layer laminating step is performed. In the plating layer laminating step, as shown in FIG. 2, the external electrodes 51, 52 and the part 33A of the interlayer connection conductors 33, 34 filled in the through hole 20D of the base material 21 are subjected to a known plating treatment. As a result, the plating layer 60 is laminated so as to completely cover the external electrodes 51, 52 and the part 33A of the interlayer connection conductors 33, 34 formed in the base material 21.

The plating layer 61 may be laminated so as to cover only a part of the external electrode 51, or the plating layer 62 may be laminated so as to cover only a part of the external electrode 52. In addition, the plating layer 60 may be laminated so as to cover only a part of the part 33A of the interlayer connection conductors 33, 34 formed in the base material 21. In addition to the external electrodes 51, 52 and the part 33A of the interlayer connection conductors 33, 34 formed in the base material 21, the plating layer 60 may be laminated so as to cover the main surface 20A around the external electrodes 51, 52.

When the cavity formed in the interlayer connection conductors 33, 34 in the firing step is open at an interface with the plating layer 60, the plating layer 60 enters the cavity. Consequently, the impregnation part 60A described above is formed.

According to this manufacturing method, a resin component is mixed in the paste 74. Therefore, in the firing step, the resin component is burned out to form a cavity in the interlayer connection conductors 33, 34. In the external electrode forming step, the external electrodes 51, 52 cover only a part of the interlayer connection conductors 33, 34. Thereafter, when the plating layer laminating step is performed, the plating layer 60 covers a part of the interlayer connection conductors 33, 34 that is not covered with the external electrodes 51, 52. Consequently, the cavities formed in the interlayer connection conductors 33, 34 can be impregnated with the plating layer 60 without via the external electrodes 51, 52.

Second Embodiment

Figure 8:
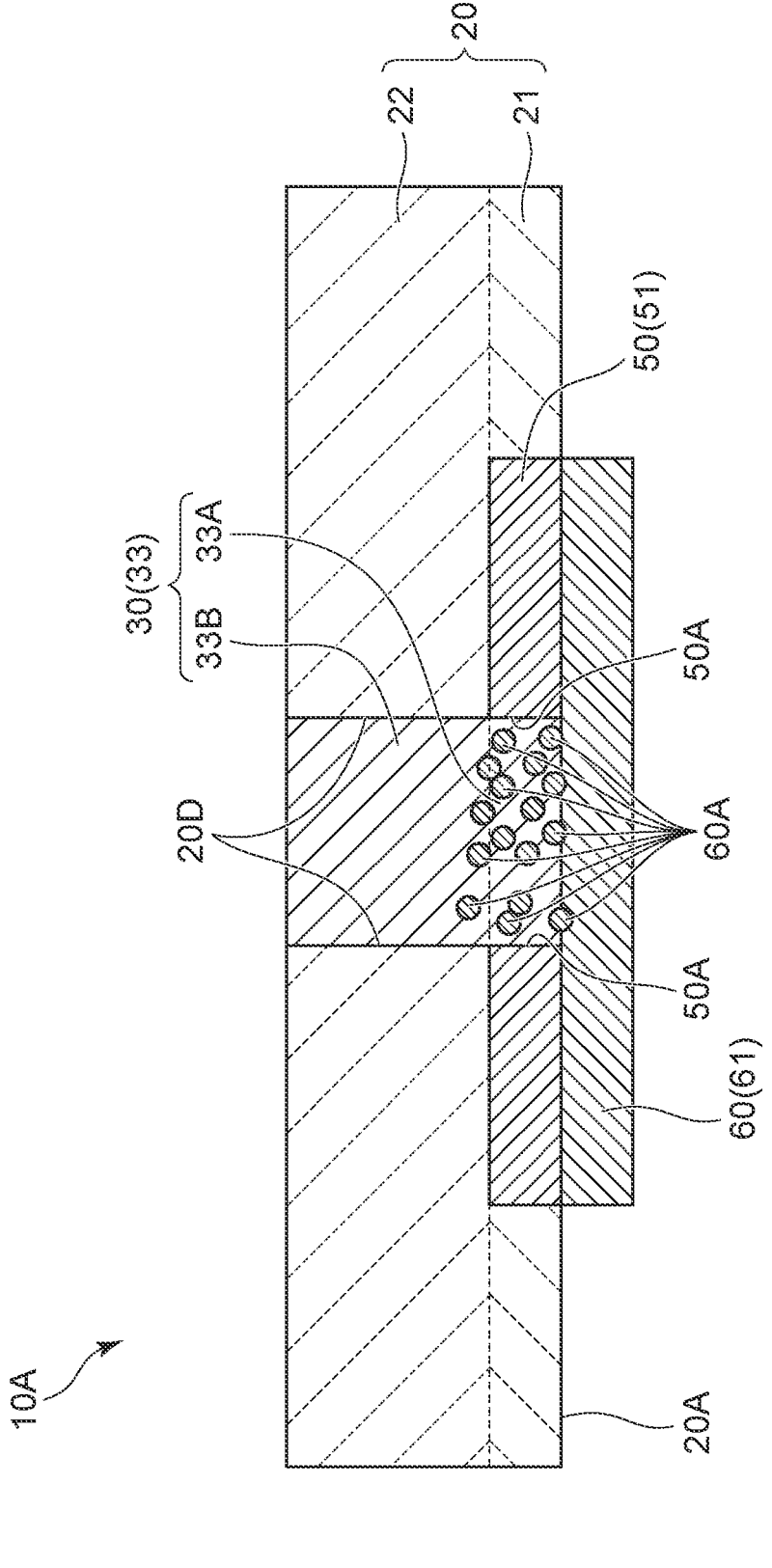
FIG. 8 is an enlarged view of a part corresponding to the dashed line in FIG. 2 in an electronic component according to a second embodiment of the present disclosure.

FIG. 8 is an enlarged view of a part corresponding to the dashed line in FIG. 2 in an electronic component according to a second embodiment of the present disclosure. An electronic component 10A according to the second embodiment is different from the electronic component 10 according to the first embodiment in that a part of the interlayer connection conductor 30 formed in the base material 22 is impregnated with the plating layer 60. In the following, differences from the first embodiment will be described. Common points to the electronic component 10 according to the first embodiment are denoted by the same reference signs, and description thereof will be omitted in principle and will be described as necessary.

In the electronic component 10A according to the second embodiment, similarly to the electronic component 10 according to the first embodiment, the interlayer connection conductor 30 is impregnated with the plating layer 60. In detail, as illustrated in FIG. 8, the interlayer connection conductor 33 is impregnated with the plating layer 61. Although not illustrated, the interlayer connection conductor 34 is impregnated with the plating layer 62.

In FIG. 8, in addition to the part 33A of the interlayer connection conductor 33 formed in the base material 21, the part 33B formed in the base material 22 out of the parts 33B formed in the base material 22 to 26 is impregnated with the plating layer 61. By contrast, the part 33B of the interlayer connection conductor 33 formed in the base material 23 to 26 is not impregnated with the plating layer 61. In other words, in the second embodiment, the impregnation part 61A of the plating layer 61 is present in a part of the interlayer connection conductor 33 formed in the base materials 21, 22. Similarly, in the second embodiment, an impregnation part 62A of the plating layer 62 is present in a part of the interlayer connection conductor 33 formed in the base materials 21, 22.

Among the plurality of base materials 21 to 28, the external electrode 50 is formed on the base material 21, and the base material 22 is laminated on the base material 21. The base material 21 is an example of a first base material. The base material 22 is an example of a second base material. The part 33A of the interlayer connection conductor 33 formed in the base material 21 penetrates the base material 21. The part 33B of the interlayer connection conductor 33 formed in the base material 22 penetrates the base material 22. The part 33A is an example of a first through electrode. The part 33B is an example of a second through electrode.

Although in the second embodiment, the impregnation part 61A of the plating layer 61 is present in a part of the interlayer connection conductor 33 formed in the base materials 21, 22, the impregnation part may be present in further more parts. For example, the impregnation part 61A of the plating layer 61 may be present in a part of the interlayer connection conductor 33 formed in the base material 21 to 24.

According to the second embodiment, the impregnation part 60A is impregnated to a deeper position than in the configuration in which only the part 33A of the interlayer connection conductors 33, 34 formed in the base material 21 is impregnated with the impregnation part 60A. Therefore, the bonding strength between the interlayer connection conductors 33, 34 and the plating layer 60 can be further increased.

The method for manufacturing the electronic component 10A according to the second embodiment is substantially similar to the method for manufacturing the electronic component 10 according to the first embodiment. Note that in the method for manufacturing the electronic component 10A according to the second embodiment, the base material 23 to 28 and each carrier film 71 on which the base material 23 to 28 is molded are filled with the paste 73 in the interlayer connection conductor forming step. On the other hand, the base materials 21, 22 and each carrier film 71 on which the base materials 21, 22 are molded are filled with the paste 74. Consequently, in the firing step, cavities are formed in the part of the interlayer connection conductors 33, 34 filled in the through hole 20D of the base materials 21, 22 (part configured with the paste 74), and in the plating layer laminating step, the part formed in the base materials 21, 22 is impregnated with the plating layer 61.

Third Embodiment

Figure 9:
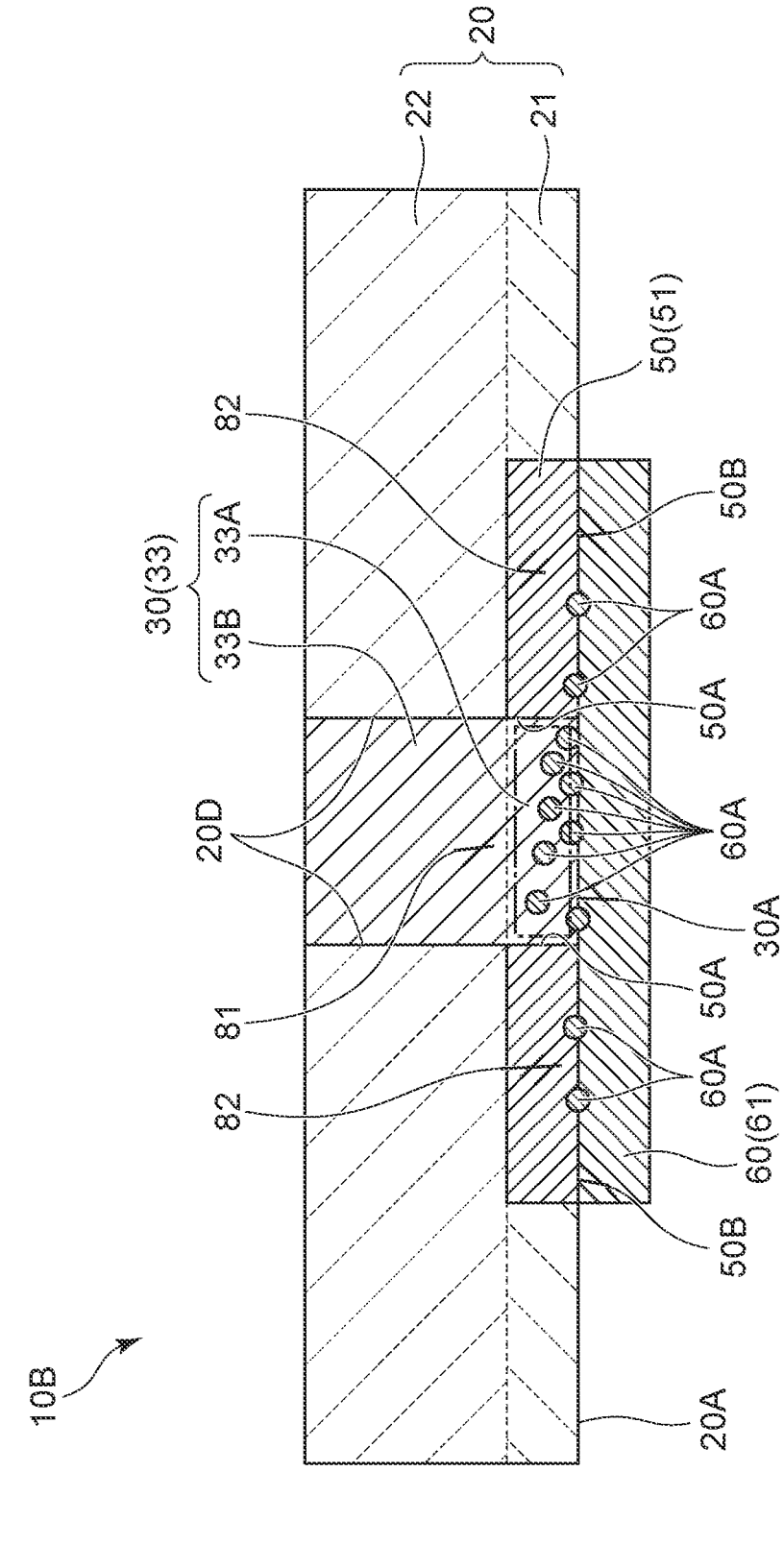
FIG. 9 is an enlarged view of a part corresponding to the dashed line in FIG. 2 in an electronic component according to a third embodiment of the present disclosure.

FIG. 9 is an enlarged view of a part corresponding to the dashed line in FIG. 2 in an electronic component according to a third embodiment of the present disclosure. An electronic component 10B according to the third embodiment is different from the electronic component 10 according to the first embodiment in that in addition to the interlayer connection conductor 30, the external electrode 50 is impregnated with the plating layer 60. In the following, differences from the first embodiment will be described. Common points to the electronic component 10 according to the first embodiment are denoted by the same reference signs, and description thereof will be omitted in principle and will be described as necessary.

In the third embodiment, the plating layer 60 is impregnated not only into the interlayer connection conductor 30 but also into the external electrode 50. In FIG. 9, the part 33A of the interlayer connection conductor 33 formed in the base material 21, and the external electrode 51 are impregnated with the plating layer 61. Similarly, although not illustrated in FIG. 9, the part 34A of the interlayer connection conductor 34 formed in the base material 21, and the external electrode 52 are impregnated with the plating layer 62. In other words, the impregnation part 60A of the plating layer 60 is present in both the interlayer connection conductor 30 and the external electrodes 51, 52. In the following, description will be made with reference to FIG. 9. In other words, while a configuration of the plating layer 61 will be described, description of the plating layer 62 having the same configuration as the plating layer 61 will be omitted.

As shown in FIG. 9, the impregnation part 60A of the plating layer 61 is impregnated into a boundary part 30A of the interlayer connection conductor 33 with the plating layer 61 at a higher density than a boundary part 50B of the external electrode 51 with the plating layer 61. The boundary part 50B is an interface with the plating layer 61 and in the vicinity of the interface in the external electrode 51. The boundary part 30A is an interface with the plating layer 61 and in the vicinity of the interface in the interlayer connection conductor 33.

Here, the external electrode 51 and the interlayer connection conductor 33 include the first part 81 and the second part 82 when viewed from a direction orthogonal to the main surface 20A of the element body 20. Of the external electrode 51 and the interlayer connection conductor 33, the first part 81 is a part overlapping the interlayer connection conductor 33 when viewed from the direction orthogonal to the main surface 20A of the element body 20. In FIG. 9, of the external electrode 51 and the interlayer connection conductor 33, the first part 81 corresponds to the interlayer connection conductor 33. Of the external electrode 51 and the interlayer connection conductor 33, the second part 82 is a part not overlapping the interlayer connection conductor 33 when viewed from the direction orthogonal to the main surface 20A of the element body 20. In FIG. 9, of the external electrode 51 and the interlayer connection conductor 33, the second part 82 corresponds to the external electrode 51.

In FIG. 9, the impregnation part 60A of the plating layer 61 is impregnated into the boundary part of the first part 81 with the plating layer 61 at a higher density than the boundary part of the second part 82 with the plating layer 61. In FIG. 9, the boundary part of the first part 81 with the plating layer 61 is the above-described boundary part 30A, and the boundary of the second part 82 with the plating layer 61 is the above-described boundary part 50B.

Figure 11:
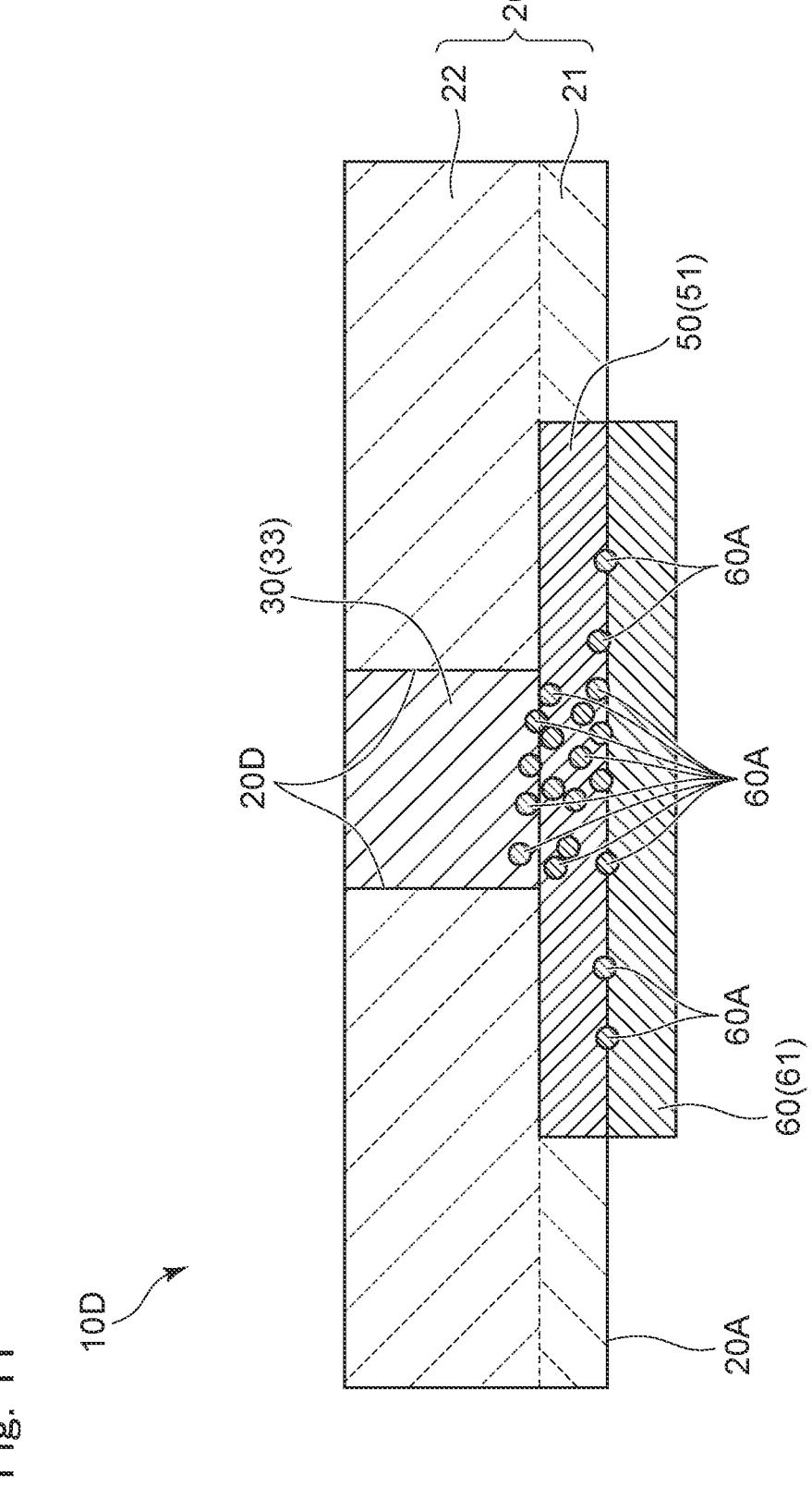
FIG. 11 is an enlarged view of a part corresponding to the dashed line in FIG. 2 in an electronic component according to a fourth embodiment of the present disclosure.

The first part 81 may be different from the interlayer connection conductor 33, and the second part 82 may be different from the external electrode 51 in some cases. For example, in a case of a fourth embodiment to be described later, the external electrode 51 is interposed between the interlayer connection conductor 33 and the plating layer 61 as shown in FIG. 11. In this case, the first part 81 corresponds to a central part of the external electrode 51 and the interlayer connection conductor 33, and the second part 82 corresponds to a part other than the central part of the external electrode 51.

In addition, in the electronic component 10B, even when the external electrode 51 and the interlayer connection conductor 33 are difficult to distinguish, i.e., when it is difficult to distinguish which one of the external electrode 51 and the interlayer connection conductor 33 corresponds to a part surrounded by a dashed line in FIG. 9, the first part 81 and the second part 82 can be easily distinguished. The following is a reason for the above. Specifically, the part 33B of the interlayer connection conductor 33 formed in the base material 22 protrudes from the external electrode 51 toward the inside of the element body 20. Therefore, of the external electrode 51 and the interlayer connection conductor 33, it is easy to distinguish a part not overlapping the part 33B when viewed from the direction orthogonal to the main surface 20A of the element body 20.

The density at each part of the impregnation part 60A is not limited to such density as described above (the density in the first part 81 is higher than the density in the second part 82). For example, the density of the impregnation part 60A at the first part 81 may be the same as the density at each part of the second part 82.

According to the third embodiment, since the external electrodes 51, 52 are impregnated with the impregnation part 60A, the bonding strength between the external electrodes 51, 52 and the plating layer 60 can be increased.

Ordinarily, the external electrodes 51 and 52 are thin in thickness. Therefore, too high the density of the impregnation part 60A impregnated into the external electrodes 51, 52 increases a possibility of occurrence of a phenomenon in which at the time of soldering the electronic component 10B to another member such as a substrate, the external electrodes 51, 52 are dissolved in solder and the external electrodes 51, 52 are resultantly eliminated. According to the third embodiment, the impregnation part 60A is impregnated into the boundary part 30A of the interlayer connection conductors 33, 34 with the plating layer 60 at a higher density than the boundary part 50B of the external electrodes 51, 52 with the plating layer 60. Therefore, the possibility of occurrence of such phenomenon in which the external electrodes 51, 52 are eliminated as described above can be reduced.

Ordinarily, the second part 82 is thinner in thickness than the first part 81. Therefore, impregnation of the impregnation part 60A into the second part 82 at a higher density than at the first part 81 increases a possibility of occurrence of a phenomenon in which at the time of soldering the electronic component 10B to another member such as a substrate, the second part 82 is dissolved in solder and the second part 82 is resultantly eliminated. According to the third embodiment, the impregnation part 60A is impregnated into the first part 81 at a higher density than the second part 82. Therefore, the possibility of occurrence of such phenomenon in which the second part 82 is eliminated as described above can be reduced.

The method for manufacturing the electronic component 10B according to the third embodiment is substantially similar to the method for manufacturing the electronic component 10 according to the first embodiment.

Note that in the method for manufacturing the electronic component 10B according to the third embodiment, in the external electrode forming step, the paste 75 corresponding to the external electrodes 51, 52 is prepared by mixing a raw material containing a conductive powder, a plasticizer, and a binder with a resin component, similarly to the paste 74. Consequently, in the firing step, cavities are formed in the part of the interlayer connection conductors 33, 34 filled in the through hole 20D of the base material 21, and the external electrodes 51, 52, and in the plating layer laminating step, the part 33A formed in the base material 21, and the external electrodes 51, 52 are impregnated with the plating layer 61.

In the method for manufacturing the electronic component 10B according to the third embodiment, a ratio of the resin component contained in the paste 75 corresponding to the external electrodes 51, 52 is lower than a ratio of the resin component contained in the paste 74. Consequently, in the firing step, a ratio of the cavities formed in the external electrodes 51, 52 becomes lower than a ratio of the cavities formed in the part of the interlayer connection conductors 33, 34 filled in the through hole 20D of the base material 21. As a result, in the plating layer laminating step, the impregnation part 60A of the plating layer 60 is impregnated into the boundary part 30A (the boundary part of the first part 81 with the plating layer 60) of the interlayer connection conductors 33, 34 with the plating layer 60 at a higher density than the boundary part 50B of the external electrodes 51, 52 with the plating layer 60 (the boundary part of the second part 82 with the plating layer 60).

According to this manufacturing method, a resin component is mixed in the paste 75 corresponding to the external electrodes 51, 52. Therefore, in the firing step, the resin component is burned out to form a cavity in the external electrodes 51, 52 configured with the paste 75. Therefore, when the plating layer laminating step is performed thereafter, the cavity formed in the external electrode 51 can be impregnated with the plating layer 60.

Ordinarily, the external electrodes 51, 52 configured with the paste 75 is thin in thickness. Therefore, too high a ratio of the resin component contained in the paste 75 increases a possibility of occurrence of the phenomenon in which at the time of soldering the electronic component 10B manufactured by this manufacturing method to another member such as a substrate, the external electrodes 51, 52 are dissolved in solder and the external electrodes 51, 52 are resultantly eliminated. According to this manufacturing method, the ratio of the resin component contained in the paste 75 is lower than the ratio of the resin component contained in the paste 74. Therefore, the possibility of occurrence of such phenomenon in which the external electrode 51 is eliminated as described above can be reduced.

Figure 10:
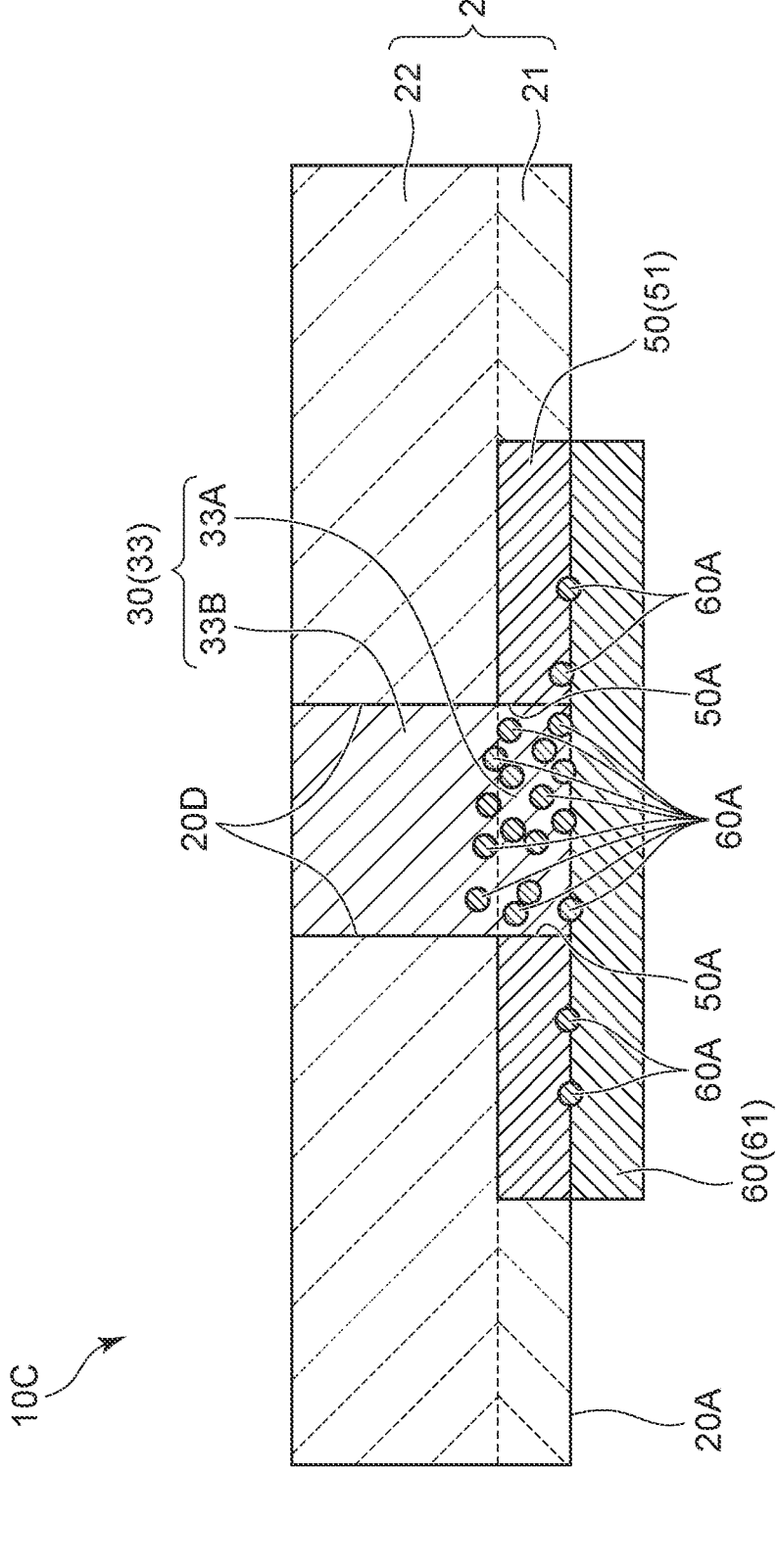
FIG. 10 is an enlarged view of a part corresponding to the dashed line in FIG. 2 in an electronic component according to a modification of the third embodiment of the present disclosure.

FIG. 10 is an enlarged view of a part corresponding to the dashed line in FIG. 2 in an electronic component according to a modification of the third embodiment of the present disclosure. In an electronic component 10C according to the modification, the parts 33A, 33B of the interlayer connection conductor 33 formed in the base materials 21, 22 and the external electrode 51 are impregnated with the plating layer 61. Similarly, although not illustrated in FIG. 9, the part 34A, 34B of the interlayer connection conductor 34 formed in the base materials 21, 22 and the external electrode 52 are impregnated with the plating layer 62. In other words, it can be said that the modification is a combination of the configuration of FIG. 8 and the configuration of FIG. 9.

Fourth Embodiment

FIG. 11 is an enlarged view of a part corresponding to the dashed line in FIG. 2 in an electronic component according to a fourth embodiment of the present disclosure. An electronic component 10D according to the fourth embodiment is different from the electronic component 10 according to the first embodiment in that the external electrode 50 is interposed between the interlayer connection conductor 30 and the plating layer 60, so that the interlayer connection conductor 30 is separated from the plating layer 60. In the following, differences from the first embodiment will be described. Common points to the electronic component 10 according to the first embodiment are denoted by the same reference signs, and description thereof will be omitted in principle and will be described as necessary.

As shown in FIG. 11, in the fourth embodiment, the external electrode 51 does not have the through hole 50A (see FIG. 3). In addition, although not illustrated, in the fourth embodiment, the external electrode 52 is configured in the same manner as the external electrode 51, and does not have the through hole 50A. In the following, description will be made with reference to FIG. 11. In other words, while a configuration of the external electrode 51 will be described, description of the external electrode 52 having the same configuration as the external electrode 51 will be omitted.

As illustrated in FIG. 11, the external electrode 51 covers the entire interlayer connection conductor 33 when viewed from the thickness direction. Consequently, the external electrode 51 is interposed between the interlayer connection conductor 33 and the plating layer 61, so that the interlayer connection conductor 33 is separated from the plating layer 61.

In the fourth embodiment, the external electrode 51 and the interlayer connection conductor 33 are impregnated with the plating layer 61. In other words, the impregnation part 60A of the plating layer 61 is present in the external electrode 51 and the interlayer connection conductor 33. In the fourth embodiment, both the external electrode 51 and the interlayer connection conductor 33 have minute cavities. At least one of the cavities of the external electrode 51 and at least one of the cavities of the interlayer connection conductor 33 communicate with each other. Consequently, the interlayer connection conductor 33 is impregnated with the impregnation part 60A of the plating layer 61 via the external electrode 51.

According to the fourth embodiment, since the external electrodes 51, 52 are impregnated with the impregnation part 60A, the bonding strength between the external electrodes 51, 52 and the plating layer 60 can be increased. In addition, since the interlayer connection conductors 33, 34 are impregnated with the impregnation part 60A impregnated into the external electrodes 51, 52, the bonding strength between the external electrodes 51, 52 and the interlayer connection conductors 33, 34 can be increased.

The method for manufacturing the electronic component 10D according to the fourth embodiment is substantially similar to the method for manufacturing the electronic component 10 according to the first embodiment. Note that some steps are different from the method for manufacturing the electronic component 10 according to the first embodiment. In the following, steps different from those of the method for manufacturing the electronic component 10 according to the first embodiment will be described in some cases.

In the method for manufacturing the electronic component 10D according to the fourth embodiment, in the external electrode forming step, the paste 75 corresponding to the external electrodes 51, 52 is prepared by mixing a raw material containing a conductive powder, a plasticizer, and a binder with a resin component, similarly to the paste 74.

Consequently, in the firing step, cavities are formed in the part of the interlayer connection conductors 33, 34 filled in the through hole 20D of the base material 21, and the external electrodes 51, 52, and in the plating layer laminating step, the interlayer connection conductors 33, 34 are impregnated with the plating layer 60 via the external electrodes 51, 52.

Here, when the amount of the resin component contained in the paste 75 is small, the number of cavities formed in the external electrodes 51, 52 is reduced in the firing step, and there is a possibility that the impregnation of the plating layer 60 is stopped at the external electrodes 51, 52 in the plating layer laminating step, preventing impregnation of the plating layer 60 up into the part 33A formed in the base material 21.

As a countermeasure, for example, in the external electrode forming step, the ratio of the resin component contained in the paste 75 is adjusted so that the impregnation of the plating layer 60 reaches the interlayer connection conductor 30 via the external electrode 50.

In addition, for example, at least one of the firing time and the firing temperature in the firing step may be adjusted. When the thickness of the external electrodes 51, 52 is small, by performing at least one of shortening the degreasing time in firing and increasing the firing temperature, an amount of shrinkage of the external electrodes 51, 52 is increased. As a result, through holes are formed in a part of the external electrodes 51, 52. The through hole corresponds to the above-described cavity. In other words, in the plating layer laminating step, the interlayer connection conductors 33, 34 can be impregnated with the plating layer 60 via the through hole. In this case, since the through hole is formed by shrinkage of the external electrodes 51, 52 by firing, the paste 75 corresponding to the external electrodes 51, 52 may not contain a resin component.

From the foregoing, in the fourth embodiment, in the firing step, the element body 20 is fired so as to form a cavity that penetrates the external electrodes 51, 52 to reach the interlayer connection conductors 33, 34.

In the method for manufacturing the electronic component 10D according to the fourth embodiment, in the plating layer laminating step, the plating layer 60 is laminated so as to cover a part of the external electrodes 51, 52 where the above-described cavity (the through hole described above is also included) is formed. Note that the plating layer 60 may cover all of the external electrodes 51 and 52, or may cover only a part of the external electrodes 51 and 52. In other words, in the plating layer laminating step, the plating layer 60 need only be laminated so as to cover at least the part of the external electrodes 51, 52, the part being where the above-described cavity (the through hole described above is also included) is formed as viewed from the thickness direction.

According to this manufacturing method, in the firing step, the cavity that penetrates the external electrodes 51, 52 to reach the interlayer connection conductors 33, 34 is formed. Thereafter, when the plating layer laminating step is performed, the cavity formed in the external electrodes 51, 52 can be impregnated with the plating layer 60.

According to this manufacturing method, a resin component is mixed in the paste 74. Therefore, in the firing step, the resin component is burned out to form a cavity in the interlayer connection conductors 33, 34. Thereafter, when the plating layer laminating step is performed, the cavity formed in the interlayer connection conductors 33, 34 can be impregnated with the plating layer 60 via the cavity formed in the external electrodes 51, 52.

Fifth Embodiment

Figure 12:
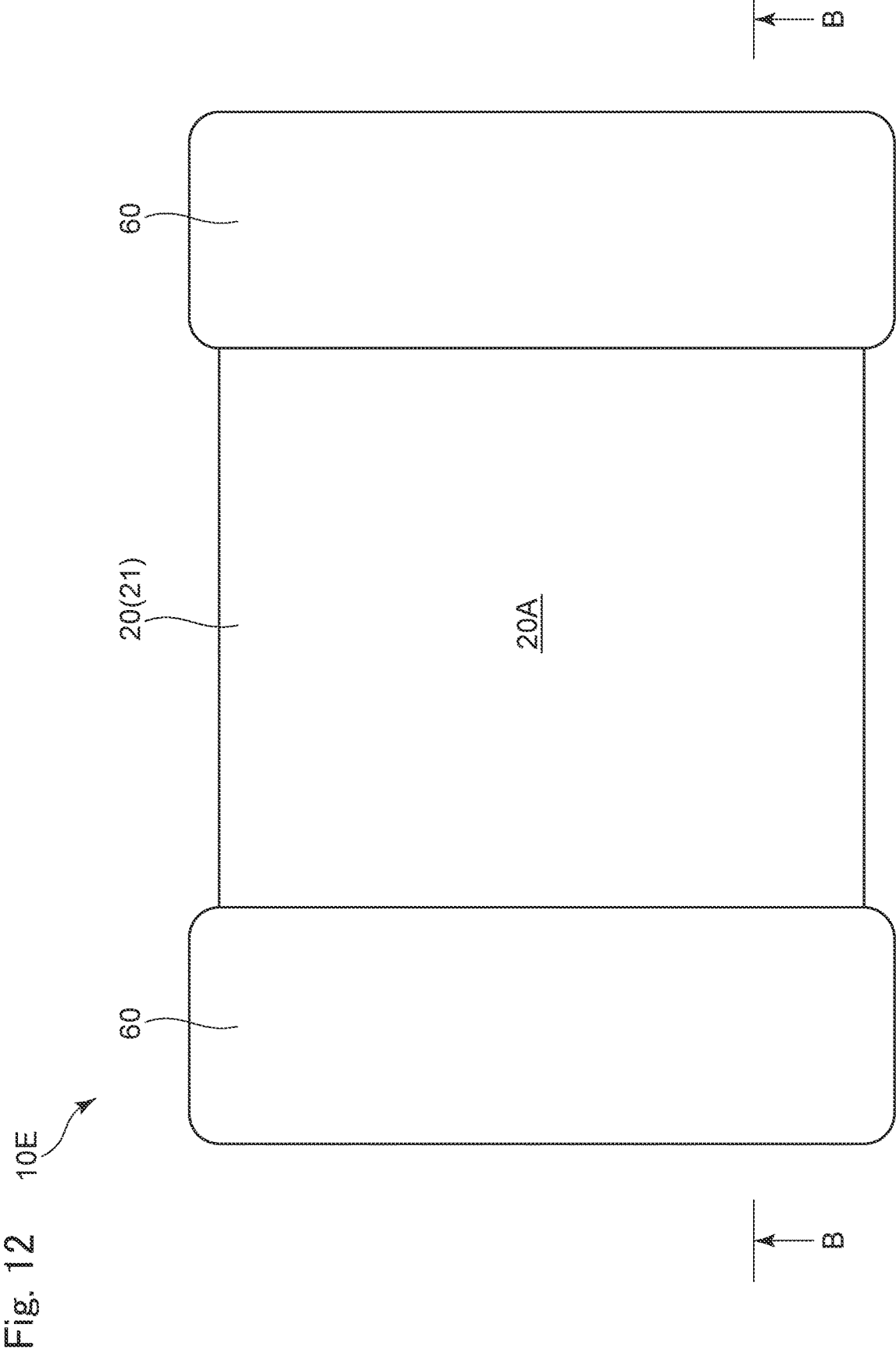
FIG. 12 is a bottom view of an electronic component according to a fifth embodiment of the present disclosure.
Figure 13:
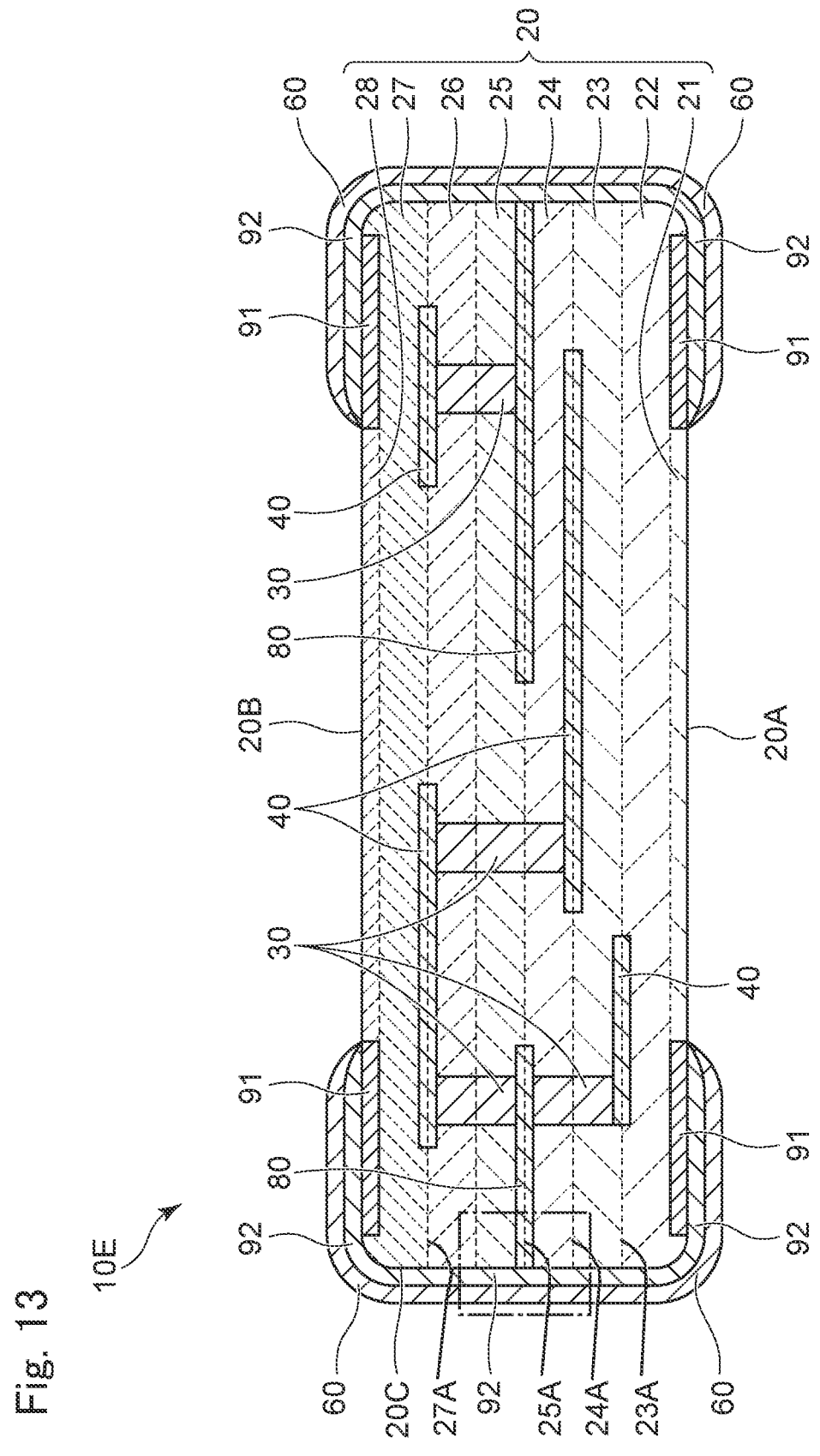
FIG. 13 is a cross-sectional view showing a cross section taken along line B-B in FIG. 12.

FIG. 12 is a bottom view of an electronic component according to a fifth embodiment of the present disclosure. FIG. 13 is a cross-sectional view showing a cross section taken along line B-B in FIG. 12. An electronic component 10E according to the fifth embodiment is different from the electronic component 10 according to the first embodiment in that a side electrode 92 is formed on the side surface 20C of the element body 20. In the following, differences from the first embodiment will be described. Common points to the electronic component 10 according to the first embodiment are denoted by the same reference signs, and description thereof will be omitted in principle and will be described as necessary.

As shown in FIGS. 12 and 13, the electronic component 10E according to the fifth embodiment includes the element body 20, the interlayer connection conductor 30, the internal electrode 40, and the plating layer 60. The electronic component 10E also includes an extraction electrode 80, a base electrode 91, and the side electrode 92. In the fifth embodiment, the extraction electrode 80 corresponds to the internal conductor, and the side electrode 92 corresponds to the external electrode. Although the electronic component 10E according to the fifth embodiment does not include the external electrode 50, the electronic component 10E may include the external electrode 50.

The element body 20, the interlayer connection conductor 30, and the internal electrode 40 are configured in the same manner as the electronic component 10 according to the first embodiment.

As illustrated in FIG. 13, the extraction electrode 80 is formed on a main surface located inside the element body 20 among the main surfaces of the plurality of base materials 21 to 28. In the fifth embodiment, the extraction electrode 80 is formed on the main surface 25A of the base material 25.

The extraction electrode 80 is configured similarly to the internal electrode 40. In other words, the extraction electrode 80 is obtained by printing a conductive paste on the main surface of the base material (the main surface 25A in the fifth embodiment) and co-firing the paste with the base material. Note that unlike the internal electrode 40, the extraction electrode 80 is exposed to the outside of the element body 20. In the fifth embodiment, the extraction electrode 80 is exposed on the side surface 20C of the element body 20. In other words, the extraction electrode 80 is formed on the side surface 20C of the element body 20. Specifically, in the fifth embodiment, the side surface 20C of the element body 20 which is configured with the side surfaces of the plurality of base materials 21 to 28 and on which the extraction electrode 90 is formed corresponds to the outer surface of the element body.

The base electrode 91 is formed in an outer part of the element body 20 (in the main surfaces 20A and 20B in the fifth embodiment). The base electrode 91 is configured similarly to the internal electrode 40 and the extraction electrode 80. Specifically, in the fifth embodiment, the base electrode 91 is obtained by printing a conductive paste on the main surface 20A, 20B of the element body 20 and co-firing the paste with the base materials.

The side electrode 92 is formed from the base electrode 91 formed on the main surface 20A of the element body 20 to the base electrode 91 formed on the main surface 20B of the element body 20 via the side surface 20C. In other words, the side electrode 92 is formed on the main surface 20A, 20B and the side surface 20C of the element body 20. The side electrode 92 is applied to the base electrode 91 and the side surface 20C by a known means such as a dipping method. As a result, the side electrode 92 is in contact with the extraction electrode 80 formed on the side surface 20C, and is electrically connected to the extraction electrode 80. Although in the fifth embodiment, the side electrode 92 covers the entire base electrode 91, the side electrode 92 may cover only a part of the base electrode 91.

Figure 14:
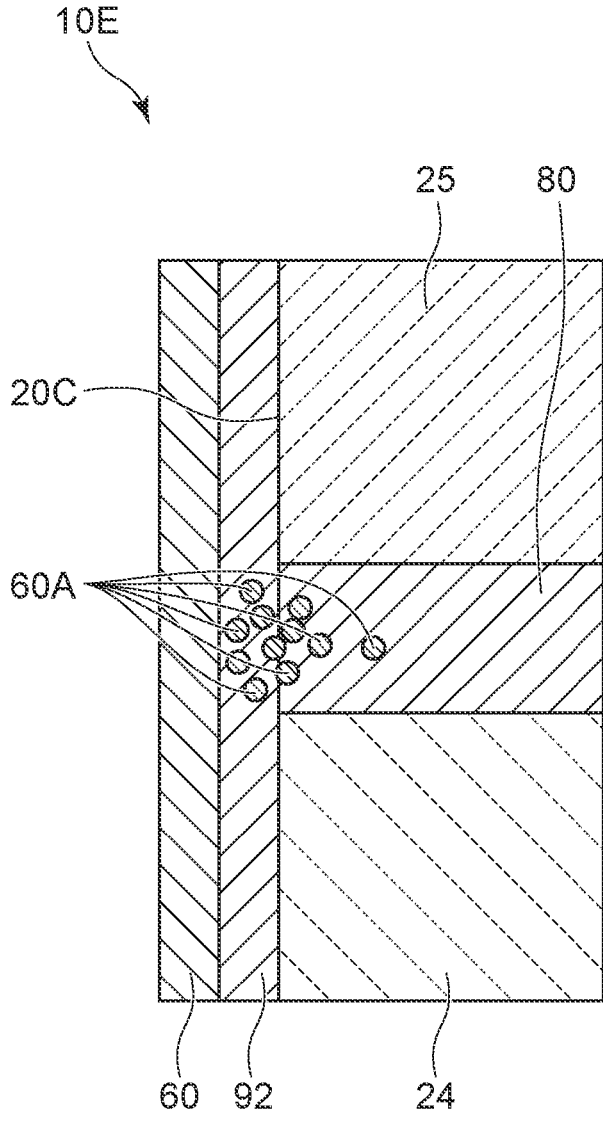
FIG. 14 is an enlarged view of a part indicated by a dashed line in FIG. 13.

In the fifth embodiment, the plating layer 60 covers the side electrode 92. FIG. 14 is an enlarged view of a part indicated by a dashed line in FIG. 13. As shown in FIG. 14, the side electrode 92 and the extraction electrode 80 are impregnated with the plating layer 60. In other words, similarly to the external electrode 50 and the interlayer connection conductor 30 of the electronic component 10D according to the fourth embodiment, both the side electrode 92 and the extraction electrode 80 have minute cavities in the fifth embodiment. At least one of the cavities of the side electrode 92 and at least one of the cavities of the extraction electrode 80 communicate with each other. Consequently, the extraction electrode 80 is impregnated with the impregnation part 60A of the plating layer 60 via the side electrode 92.

Although in the fifth embodiment, the plating layer 60 covers the entire side electrode 92, the plating layer 60 may cover only a part of the side electrode 92. In addition, similarly to the external electrode 50 and the interlayer connection conductor 30 of the electronic component 10 according to the first embodiment, the plating layer 60 may be in direct contact with the extraction electrode 80 without via the side electrode 92.

Ordinarily, the extraction electrode 80 formed by printing on the main surface of the base material is thin in thickness. Therefore, a connection strength of the extraction electrode 80 to the side electrode 92 is low. However, according to the fifth embodiment, since the plating layer 60 is impregnated into the extraction electrode 80, a bonding strength between the plating layer 60 and the extraction electrode 80 which are located so as to sandwich the side electrode 92 is increased, so that a bonding strength between the side electrode 92 and the extraction electrode 80 can be increased. In addition, in the configuration of FIG. 13, since the extraction electrode 80 is impregnated with the plating layer 60 via the side electrode 92, a bonding strength between the side electrode 92 and the plating layer 60 can be increased, and the bonding strength between the side electrode 92 and the extraction electrode 80 can be increased.

<Method for Manufacturing Electronic Component 10E According to Fifth Embodiment>

Figure 15:
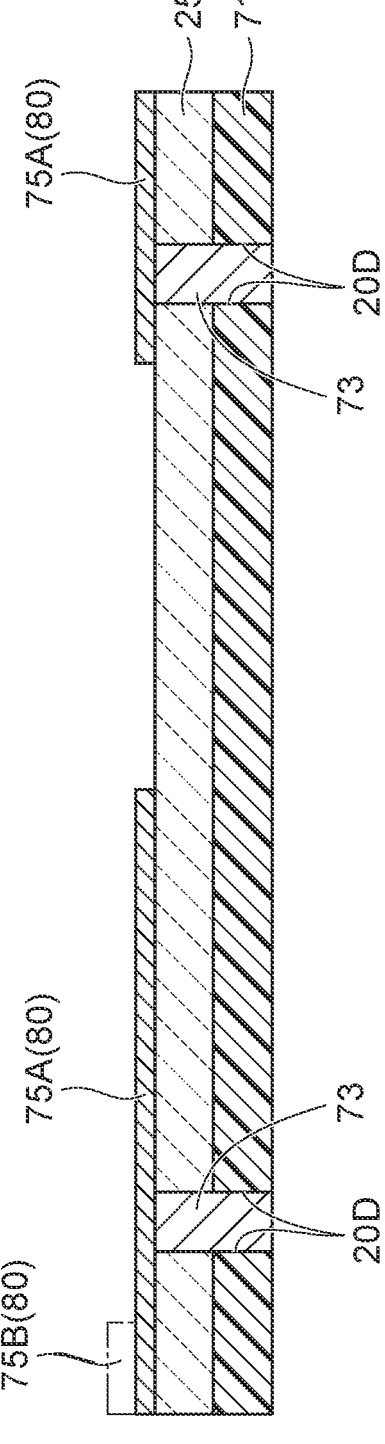
FIG. 15 is a cross-sectional view when an extraction electrode is printed on a base material in which an interlayer connection conductor is formed in a method for manufacturing an electronic component according to the fifth embodiment of the present disclosure.
Figure 16:
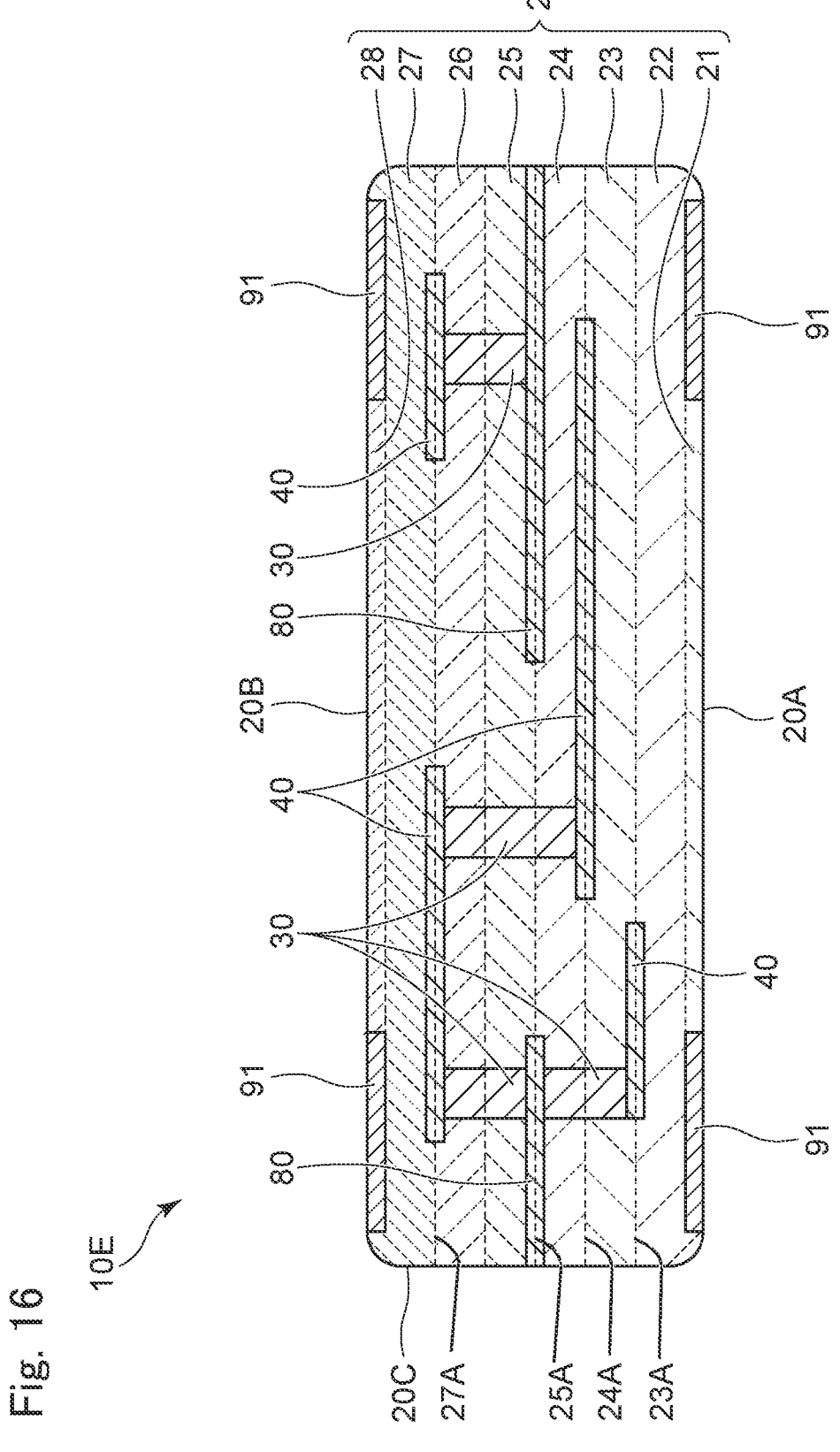
FIG. 16 is a cross-sectional view when a plurality of base materials are laminated to form an element body in the method for manufacturing an electronic component according to the fifth embodiment of the present disclosure.
Figure 17:
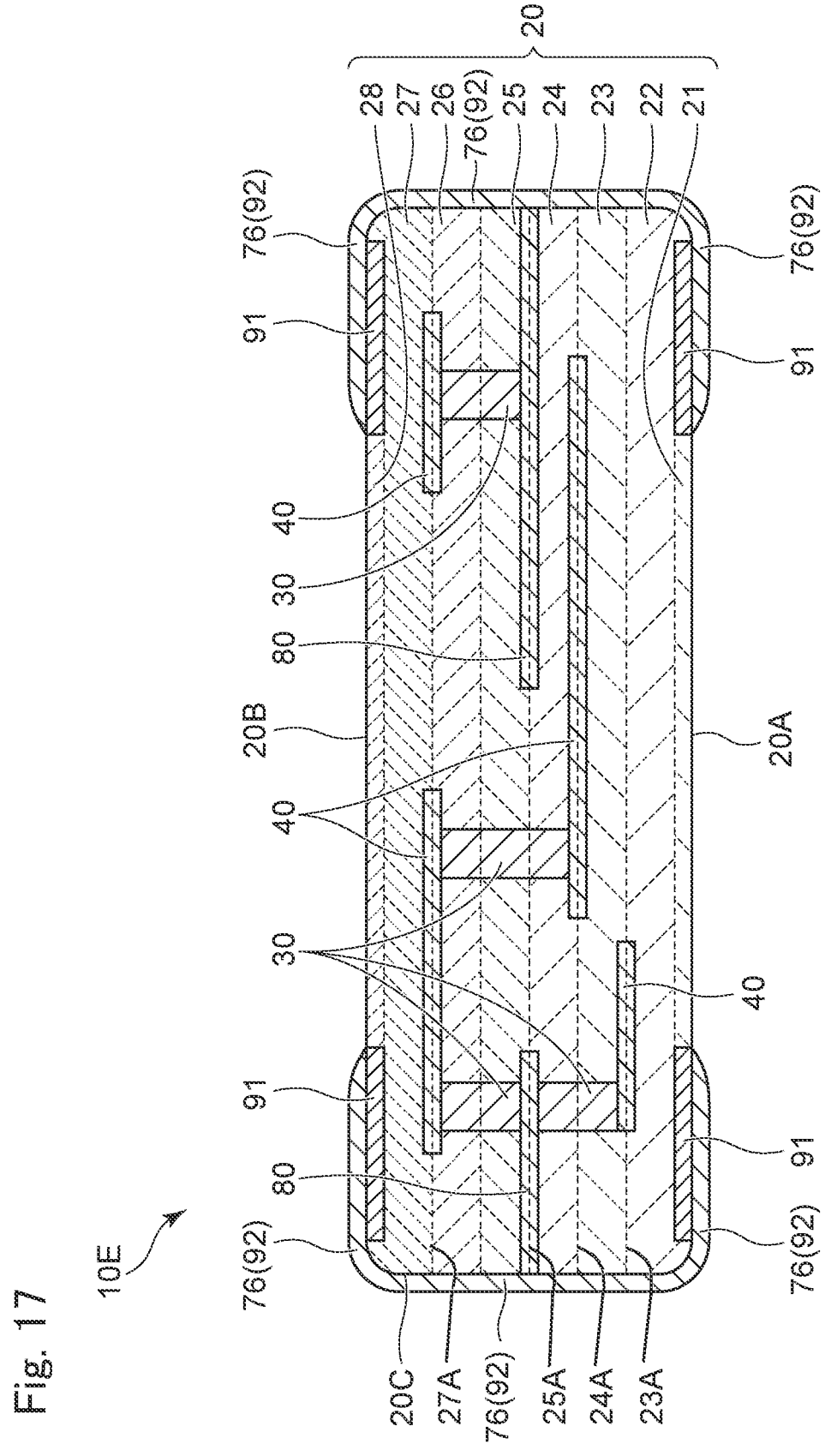
FIG. 17 is a cross-sectional view when a side electrode is applied to the element body in FIG. 16.

In the following, a method for manufacturing an electronic component 10E according to a fifth embodiment will be described with reference to FIGS. 15 to 17. FIG. 15 is a cross-sectional view when an extraction electrode is printed on a base material in which an interlayer connection conductor is formed in the method for manufacturing an electronic component according to the fifth embodiment of the present disclosure. FIG. 16 is a cross-sectional view when a plurality of base materials are laminated to form an element body in the method for manufacturing an electronic component according to the fifth embodiment of the present disclosure. FIG. 17 is a cross-sectional view when a side electrode is applied to the element body of FIG. 16. In the following, differences from the method for manufacturing the electronic component 10 according to the first embodiment will be described. Common points to the method for manufacturing the electronic component 10 according to the first embodiment are denoted by the same reference signs, and description thereof will be omitted in principle and will be described as necessary.

In the method for manufacturing the electronic component 10E according to the fifth embodiment, the sheet molding step, the interlayer connection conductor forming step, the internal electrode forming step, a base electrode forming step, the element body forming step, a side electrode forming step, the firing step, the segmenting step, and the plating layer laminating step are performed.

First, a sheet molding step is performed. Next, an interlayer connection conductor forming step is performed. The sheet molding step and the interlayer connection conductor forming step are similar to those in the method for manufacturing the electronic component 10 according to the first embodiment.

Next, an internal electrode forming step is performed. In the internal electrode forming step, the internal electrode 40 and the extraction electrode 80 are formed. In the fifth embodiment, the internal electrode forming step corresponds to the internal conductor forming step.

Similarly to the method for manufacturing the electronic component 10 according to the first embodiment, the internal electrode 40 is formed by, for example, printing the paste 75 on the main surface of the base material. In the fifth embodiment, the internal electrode 40 is formed on the main surface 23A, 24A, 27A of the base material 23, 24, 27 (see FIG. 13). The paste 75 is prepared by mixing a raw material containing a conductive powder, a plasticizer, and a binder, and does not contain a resin component.

The extraction electrode 80 is formed by printing a paste 75A on the main surface of the base material, or the like, similarly to the method for manufacturing the electronic component 10 according to the first embodiment. In the fifth embodiment, the extraction electrode 80 is formed on the main surface 25A of the base material 25 (see FIGS. 13 and 15). The paste 75A is prepared by mixing a raw material containing a conductive powder, a plasticizer, a binder, and a resin component. In other words, the paste 75A contains a resin component. In the method for manufacturing the electronic component 10 according to the fifth embodiment, the paste 75A corresponds to the first paste.

The extraction electrode 80 is formed in a region including an outer edge of the main surface 25A of the base material 25. On the other hand, the internal electrode 40 is formed in a region not including an outer edge of the main surface 23A, 24A, 27A of the base material 23, 24, 27.

The extraction electrode 80 may be printed a plurality of times. For example, as indicated by a chain double-dashed line in FIG. 15, the extraction electrode 80 may be formed of the paste 75A printed for the first time and a paste 75B printed on the paste 75A for the second time. The paste 75B is prepared by mixing a raw material containing a conductive powder, a plasticizer, and a binder. The paste 75B may be mixed with a resin component in addition to the above-described raw material. For example, the paste 75A may contain a resin component, and the paste 75B may not contain a resin component. For example, the paste 75B may contain a resin component, and the paste 75A may not contain a resin component conversely to the above case. Furthermore, for example, both the pastes 75A and 75B may contain a resin component.

Next, the base electrode forming step is performed. In the base electrode forming step, the base electrode 91 is formed. When the electronic component 10E includes the external electrode 50, the external electrode 50 is formed in the base electrode forming step. In addition, the base electrode forming step may be performed after the interlayer connection conductor forming step and before the internal electrode forming step, or may be performed in parallel with the internal electrode forming step.

The base electrode 91 and the external electrode 50 are formed on the main surface of the base material in the same manner as the internal electrode 40 and the extraction electrode 80. In the fifth embodiment, the base electrode 91 is formed on the main surface of the base material 21, 28, i.e., on the main surface 20A, 20B of the element body 20 when the element body 20 is formed.

Next, an element body forming step is performed. In the element body forming step, as shown in FIG. 16, the base materials 21, 22, 23, 24, 25, 26, 27, 28 are laminated in this order similarly to the method for manufacturing the electronic component 10 according to the first embodiment. Consequently, the main surface 25A of the base material 25 on which the extraction electrode 80 is formed becomes a surface located inside the element body 20 (an inner surface of the element body 20). Consequently, a part of the extraction electrode 80 formed at the outer edge of the main surface 25A is exposed on the side surface 20C of the element body 20.

Next, the side electrode forming step is performed. In the fifth embodiment, the side electrode forming step corresponds to the external electrode forming step.

In the side electrode forming step, as shown in FIG. 17, the side electrode 92 is formed on the main surface 20A, 20B (in detail, the base electrode 91 formed on the main surface 20A, 20B) and on the side surface 20C of the element body 20.

In the side electrode forming step, a paste 76 is applied to the main surface 20A, 20B and the side surface 20C of the element body 20 by a dipping method or the like, thereby forming the side electrode 92. At this time, the extraction electrode 80 exposed on the side surface 20C of the element body 20 is covered with the paste 76 and comes into contact with the paste 76.

The paste 76, which is prepared in the same manner as the paste 75A, may contain a resin component or may not contain a resin component. In the method for manufacturing the electronic component 10E according to the fifth embodiment, the paste 76 corresponds to the second paste.

Next, a segmenting step is performed. The segmenting step is similar to the method for manufacturing the electronic component 10 according to the first embodiment.

Next, the firing step is performed. The firing step is similar to the method for manufacturing the electronic component 10D according to the fourth embodiment. In other words, in the fifth embodiment, in the firing step, the element body 20 is fired so as to form a cavity that penetrates the side electrode 92 to reach the extraction electrode 80.

Specifically, when the paste 76 contains a resin component, the resin component is burned out by firing of the element body 20, so that a cavity is formed in a part from which the resin component has been burnt out. In a case where the paste 76 does not contain a resin component, execution of at least one of prolonging the firing time and increasing the firing temperature increases an amount of shrinkage of the side electrode 92, resulting in forming a through hole in a part of the side electrode 92. The through hole corresponds to the above-described cavity.

Next, a plating layer laminating step is performed. The plating layer laminating step is similar to the method for manufacturing the electronic component 10D according to the fourth embodiment. Specifically, in the plating layer laminating step, the plating layer 60 is laminated so as to cover the part of the side electrode 92, the part being where the above-described cavity (the above described through hole is also included) is formed. Note that the plating layer 60 may cover the entire side electrode 92 or only a part of the side electrode 92. In other words, in the plating layer laminating step, the plating layer 60 need only be laminated on the side surface 20C of the fired element body 20 so as to cover at least the part of the side electrode 92, the part being where the above-described cavity (the above-described through hole is also included) is formed.

The laminated plating layer 60 is impregnated into the above-described cavity to form the impregnation part 60A (see FIG. 14).

According to this manufacturing method, in the firing step, a cavity that penetrates the side electrode 92 to reach the extraction electrode 80 is formed. Thereafter, when the plating layer laminating step is performed, the cavity formed in the side electrode 92 can be impregnated with the plating layer 60.

According to this manufacturing method, a resin component is mixed with the paste 75A. Therefore, in the firing step, the resin component is burned out to form a cavity in the extraction electrode 80. Thereafter, when the plating layer laminating step is performed, the cavity formed in the extraction electrode 80 can be impregnated with the plating layer 60 via the cavity formed in the side electrode 92.

Note that by appropriately combining arbitrary embodiments among the various embodiments described above, the effects of the respective embodiments can be achieved.

For example, in the electronic component 10E according to the fifth embodiment, the plating layer 60 and the extraction electrode 80 may be configured to be in direct contact with each other by forming a through hole in the side electrode 92. In this example, the configuration of the electronic component 10E according to the fifth embodiment and the configuration of the electronic component 10 according to the first embodiment (the configuration in which the external electrode 50 has the through hole 50A) are combined.

Although the present disclosure has been sufficiently described in connection with the preferred embodiments with reference to the drawings as appropriate, various modifications and rectifications are apparent to those skilled in the art. Such modifications and rectifications should be understood to be included within the scope of the present disclosure according to the appended claims without departing therefrom.

10 electronic component
      20 element body
      20A main surface (outer surface)
      20C side surface (outer surface)
      20D through hole
      21 base material (first base material)
      22 base material (second base material)
      25 base material
      25A main surface
      33 interlayer connection conductor (internal conductor)
      33A part (first through electrode)
      33B part (second through electrode)
      34 interlayer connection conductor (internal conductor)
      50 external electrode
      60 plating layer
      60A impregnation part
      74 paste (first paste)
      75 paste (second paste)
      75A paste (first paste)
      76 paste (second paste)

27

80 extraction electrode (internal conductor)
81 first part
82 second part
92 side electrode (external electrode)

What is claimed is:

1. An electronic component comprising:
an element body;
an internal conductor provided inside the element body so as to extend to an outer surface of the element body;
an external electrode provided on the outer surface of the element body so as to cover at least a part of the internal conductor; and
a plating layer covering at least a part of the external electrode, wherein
the plating layer comprises an impregnation part impregnated into the internal conductor, wherein
the external electrode is impregnated with the impregnation part, and wherein
a boundary part of the internal conductor with the plating layer is impregnated with the impregnation part at a higher density than a boundary part of the external electrode with the plating layer.

2. The electronic component of claim 1, wherein
the element body comprises a plurality of laminated insulating and plate-shaped base materials, wherein
the external electrode is provided on a main surface facing an outside of the element body among main surfaces of the plurality of base materials, and wherein
the internal conductor is filled in a through hole penetrating at least one of the plurality of base materials.

3. The electronic component of claim 2, wherein
the internal conductor comprises
a first through electrode penetrating a first base material having the external electrode provided among the plurality of base materials, and
a second through electrode penetrating a second base material laminated on the first base material among the plurality of base materials and being in contact with the first through electrode, and wherein
the impregnation part is impregnated into the first through electrode and the second through electrode.

4. The electronic component of claim 1, wherein
the element body comprises a plurality of laminated insulating and plate-shaped base materials, wherein
the outer surface of the element body having the external electrode provided is configured with side surfaces of the plurality of base materials, and wherein
the internal conductor is provided in a main surface located inside the element body among the main surfaces of the plurality of base materials.

5. The electronic component of claim 1, wherein
the external electrode and the internal conductor comprise
a first part overlapping the internal conductor when viewed from a direction orthogonal to the outer surface of the element body and a second part not overlapping the internal conductor when viewed from the direction orthogonal to the outer surface of the element body, and wherein
a boundary part of the first part with the plating layer is impregnated with the impregnation part at a higher density than a boundary part of the second part with the plating layer.

6. The electronic component of claim 1, wherein
the external electrode is interposed between the internal conductor and the plating layer, wherein
the internal conductor is separated from the plating layer, and wherein

28 the internal conductor is impregnated with the impregnation part via the external electrode.

7. The electronic component of claim 1, wherein
the external electrode is provided on the outer surface of the element body so as to cover a part of the internal conductor, and wherein
the internal conductor is in contact with the plating layer on the outer surface of the element body.

8. An electronic component comprising:
an element body;
an internal conductor provided inside the element body so as to extend to an outer surface of the element body;
an external electrode provided on the outer surface of the element body so as to cover at least a part of the internal conductor; and
a plating layer covering at least a part of the external electrode, wherein
the plating layer comprises an impregnation part impregnated into the internal conductor, wherein
the external electrode is impregnated with the impregnation part, wherein
the external electrode and the internal conductor comprise a first part overlapping the internal conductor when viewed from a direction orthogonal to the outer surface of the element body and a second part not overlapping the internal conductor when viewed from the direction orthogonal to the outer surface of the element body, and wherein
a boundary part of the first part with the plating layer is impregnated with the impregnation part at a higher density than a boundary part of the second part with the plating layer.

9. The electronic component of claim 8, wherein
the element body comprises a plurality of laminated insulating and plate-shaped base materials, wherein
the external electrode is provided on a main surface facing an outside of the element body among main surfaces of the plurality of base materials, and wherein
the internal conductor is filled in a through hole penetrating at least one of the plurality of base materials.

10. The electronic component of claim 9, wherein
the internal conductor comprises
a first through electrode penetrating a first base material having the external electrode provided among the plurality of base materials, and
a second through electrode penetrating a second base material laminated on the first base material among the plurality of base materials and being in contact with the first through electrode, and wherein
the impregnation part is impregnated into the first through electrode and the second through electrode.

11. The electronic component of claim 8, wherein
the element body comprises a plurality of laminated insulating and plate-shaped base materials, wherein
the outer surface of the element body having the external electrode provided is configured with side surfaces of the plurality of base materials, and wherein
the internal conductor is provided in a main surface located inside the element body among the main surfaces of the plurality of base materials.

12. The electronic component of claim 8, wherein
the external electrode is interposed between the internal conductor and the plating layer, wherein
the internal conductor is separated from the plating layer, and wherein
the internal conductor is impregnated with the impregnation part via the external electrode.

13. The electronic component of claim 8, wherein the external electrode is provided on the outer surface of the element body so as to cover a part of the internal conductor, and wherein the internal conductor is in contact with the plating layer on the outer surface of the element body.

* * * * *